US006248806B1

(12) United States Patent
Codolar et al.

(10) Patent No.: US 6,248,806 B1
(45) Date of Patent: Jun. 19, 2001

(54) ANTIFOULING PAINT

(75) Inventors: Santiago Arias Codolar, Barcelona (ES); Helle Simon Elbro, Kastrup (DK)

(73) Assignee: J.C. Hempel's Skibsfarve-Fabrik A/S, Lyngby (DK)

( * ) Notice: Subject to any disclaimer, the term of this patent is extended or adjusted under 35 U.S.C. 154(b) by 0 days.

(21) Appl. No.: 09/194,197

(22) PCT Filed: May 22, 1997

(86) PCT No.: PCT/DK97/00235

§ 371 Date: Jan. 20, 1999

§ 102(e) Date: Jan. 20, 1999

(87) PCT Pub. No.: WO97/44401

PCT Pub. Date: Nov. 27, 1997

(30) Foreign Application Priority Data

May 22, 1996 (DK) .................................................. 0598/96

(51) Int. Cl.$^7$ ..................................................... C08J 4/00
(52) U.S. Cl. ..................... 523/177; 106/15.05; 106/639; 106/711
(58) Field of Search ...................... 523/177; 106/15.05, 106/16, 634, 711, 712, 238, 248

(56) References Cited

U.S. PATENT DOCUMENTS

| | | |
|---|---|---|
| 4,064,307 | 12/1977 | Lajoie . |
| 4,075,319 | 2/1978 | Dyckman et al. . |
| 4,881,976 | * 11/1989 | Gradeff ............................. 106/15.05 |
| 4,962,135 | * 10/1990 | Braeken et al. ..................... 523/122 |
| 5,008,146 | 4/1991 | Keohan . |
| 5,049,382 | 9/1991 | Price et al. . |
| 5,266,105 | * 11/1993 | Tsuneta et al. ......................... 106/16 |
| 5,367,009 | * 11/1994 | Inoue et al. ........................... 524/272 |
| 5,403,390 | * 4/1995 | Spera et al. ....................... 106/15.05 |
| 5,795,374 | * 8/1998 | Itoh et al. .............................. 106/16 |

FOREIGN PATENT DOCUMENTS

| | | |
|---|---|---|
| 0289481 | 11/1988 | (EP) . |
| 0499817 | 8/1992 | (EP) . |
| 0526441B1 | 2/1993 | (EP) . |
| 0698643 | 2/1996 | (EP) . |
| 4-306269 | 10/1992 | (JP) . |
| 9006968 | 6/1990 | (WO) . |

OTHER PUBLICATIONS

Kirk–Othmer, Encyclopedia of Chemical Technology, 3$^{rd}$ edition, vol. 6, pp. 455–481.
R. Lambourne, Paint and Surface Coating –Theory and Practice, Ellis Horwood Limited, Chicester and Halsted Press (John Wiley & Sons New York), 1987, pp. 541–546.
Kirk–Othmer, Encyclopedia of Chemical Technology, 3$^{rd}$ edition, vol. 17, pp. 810–811.
Database WPI, Section Ch, Week 9250 Derwent Publications Ltd., London, GB; Class A18, AN 92–410453.

* cited by examiner

Primary Examiner—Edward J. Cain
Assistant Examiner—Katarzyna Lee Wyrozebski
(74) Attorney, Agent, or Firm—Birch, Stewart, Kolasch & Birch, LLP

(57) ABSTRACT

The present invention related to self-polishing marine antifouling paint compositions comprising rosin or rosin equivalent(s), optionally fibres, and one or more polymeric flexibilizer component(s). The rosin part of the paint preferably comprises ammonium or metal salts of rosin and/or rosin qualities having a low content of conjugated double bonds, i.e. a low degree of unsaturation. The non-crystalline flexibilizer components have a glass transition temperature, Tg, in the range of −45 to 25° C. and are preferably selected from poly(meth)acrylates, polyacrylamides, copolymer and terpolymers thereof, acrylamide resins, acrylic acrylamide resins, polyvinyl ethers, polyvinyl esters, polyester, polyoxy-$C_{1-5}$-alkylenes, polyurethanes, and epoxy esters. The fibres are preferably natural or synthetic inorganic or organic fibres or metal fibres. The paints have improved mechanical properties such as strength and resistance towards weathering.

24 Claims, No Drawings

ANTIFOULING PAINT

This application is the national phase under 35 U.S.C. §371 of prior PCT International Application No. PCT/DK97/00235 which has an International filing date of May 22, 1997 which designated the United States of America.

FIELD OF THE INVENTION

The present invention relates to antifouling paints that prevent unwanted fouling organisms from attaching and growing on immersed structures that come in contact with water, especially sea water, for example vessels (including but not limited to boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, underwater oil well structures, nets and other aquatic culture installations, and buoys etc.

BACKGROUND OF THE INVENTION

On underwater structures and on ship's hulls which are exposed to sea and/or fresh water, attachment and growth of marine organisms such as green algae, such as Enteromorpha spp. and Ulva spp., diatoms, such as Amphora spp., tubeworms, barnacles such as Balanus spp., ascidians, sponges, hydroids etc. cause severe economic losses because of the increased friction (and therefore increased consumption of fuel), or increased resistance to waves or currents (for static structures such as off-shore rigs), and because of decreased un-docking time.

In order to solve the fouling problem several antifouling paint technologies have been developed. Some technologies are based on the principle of incorporating biologically active agents into the paint. However, in order to obtain a satisfactory incorporation and a proper controlled release of the biologically active agents, the mechanical properties of the antifouling paint, e.g. the mechanical strength of the paint and the ability of the paint to adhere to other paints, may be impaired.

Another antifouling paint technology that has been investigated for a number of years, is the use of self-polishing antifouling paint compositions in which the polymer of the binder system is a trialkyltin derivative of a polymer containing carboxylic acid groups in the monomer segments, the alkyltin groups being situated on the carboxylic acid groups. However, the increasing problem of pollution with tin compounds in, e.g., harbours has led to intensive research efforts to provide tin-free self-polishing antifouling paints.

The search for binder systems for tin-free self-polishing antifouling paints, on the one hand having inherent self-polishing properties and exhibiting good capabilities for incorporation of biologically active agents, and on the other hand being able to convey a good mechanical strength of the paint film, has so far been a difficult task.

One way of obtaining binder systems for antifouling paints, such as for tin-free self-polishing antifouling paints, is to employ substances such as rosin or rosin equivalents as part of the binder system. Rosin or rosin equivalents has a number of highly desirable properties for use in antifouling paints; due to its water solubility it is capable of releasing biologically active agents into the water at a controlled rate. Also, it is compatible with a large number of binder components; this facilitates the formulation of a final coating product. Furthermore, it is readily available, relatively cheap and originates from a self-renewable natural source. In principle, the water solubility gives the opportunity of obtaining a high polishing rate in a rosin-containing paint if a high proportion of rosin or rosin equivalent is incorporated. However, inclusion of a high proportion of rosin or rosin equivalents in order to ensure a polishing rate optimal for practical purposes leads to an antifouling paint having severe mechanical deficiencies, such as cracking tendencies and poor resistance to weathering.

Therefore, due to the inherent mechanical deficiencies of such self-polishing binder systems, their polishing properties can not be fully expressed. The applicant's previous application, WO 96/15198, provides solutions to this problem, however, the applicant has now, after further development work, found important improvements and alternatives to the invention previously described.

SUMMARY OF THE INVENTION

The present invention, i.a., relates to a marine antifouling paint comprising rosin or rosin equivalents, one or more polymeric flexibilizer component(s), and fibres.

DETAILED DESCRIPTION OF THE INVENTION

The marine antifouling paint according to the present invention is preferably a self-polishing antifouling paint.

The present invention provides an antifouling paint which contains a high proportion of rosin or rosin equivalents, such as a proportion of 15% by solids volume of the paint or even more, such as up to 80% solids volume of the paint, but which, at the same time, has satisfactory mechanical properties which render it realistic to employ such paint for normal and even demanding anti-fouling purposes, such as being exposed to sunlight for prolonged periods of time, or being exposed to cycles of immersion/sunlight exposure as it happens in the water-line of a ship.

Thus, this invention makes it possible to utilise the desired beneficial properties of rosin and rosin equivalents in anti-fouling paints, and to increase the content of rosin or rosin equivalents with full or substantially full retainment of the crucial antifouling properties of the paints, and even enhancement of the antifouling properties due to the incorporation of higher amounts of rosin or rosin equivalent(s). This may be achieved by using polymeric flexibilizer component(s) in combination with reinforcing fibres and rosin and rosin equivalents. Thus, by setting up special requirement to the quality of the rosin or rosin equivalents and the polymeric flexibilizer component(s), the properties of antifouling paints may be improved.

In the present context, the terms "self-polishing" and "polishing" are intended to mean that the coating in question, or the paint when dried up as a coating, under the test conditions described in the Polishing Rate Test herein, is subject to a reduction of the thickness of the coating of at least 1 $\mu$m per 10,000 Nautical miles (18,520 km) of relative movement between the coated surface and the surrounding aqueous medium due to removal of coating material from the surface of the coating.

In the present context the terms "mechanically weak" and "mechanical deficiency" relate to a paint which (a) when in the Steel Panel Elongation Test herein shows micro or macro cracking when elongated 4 mm or (b) when tested in Laboratory Cracking Test herein results in a ranking of below 5.

Alternatively, mechanical weakness or deficiency of a paint can also be identified by testing the paint in the Direct Impact test or the Mandrel Test described herein; i.e. mechanical deficiency is also identified for a paint tested in the Mandrel Test herein showing failure when using a mandrel having a diameter of 20 mm, or tested in the Direct Impact Test herein showing failure when hit by the standard weight dropped from a height of 40 cm.

In the present context the term "marine" relates to any kind of aqueous environment such as salt, brackish or fresh water. The term "immersed" relates to structures being contacted with such a marine environment.

In the present context the term "% by solids volume" is intended to mean the volume/volume percentage of the dry matter of the paint.

According to the present invention, the paint comprises a polymeric flexibilizer as well as fibres. The fibres may, in principle, be any fibres which, either in the native form or after surface modification, are capable of being incorporated in an antifouling paint having mechanical deficiencies, but preferably, the fibres are fibres which will improve the mechanical strength of an antifouling paint tested in the Laboratory Cracking Test herein. The fibres may, as it will be clear from the description of the manufacture processes further below, be added together with the remaining paint constituents before milling or may be added afterwards.

In the present context the term "fibres" is intended to mean any fibres within the groups of natural inorganic fibres, synthetic inorganic fibres, natural organic fibres, synthetic organic fibres, and metallic fibres, or mixtures thereof, preferably inorganic or organic fibres or mixtures thereof. Furthermore, the term "fibres" is intended to cover monofilaments, split fibres, and stable fibres of any cross section. Thus, the term also comprises bands, needles, whiskers, and strips. The fibres may or may not have been surface treated or coated.

However, the term "fibre" is not intended to include materials which are used as fillers (e.g. thixotropic agents and frayed type fillers with no well defined dimensions such as asbestine), cf. Hawley's Condensed Chemical Dictionary, 11$^{th}$ Ed., (Sax and Lewis, eds.), Van Nostrand Reinhold Company, New York, 1987, page 521.

Thus, it is preferred that the ratio between the largest dimension (typically the average fibre length) and the smallest dimension (typically the average fibre thickness) of the "fibres" used in the paints according to the present invention is at least 5, such as at least 10.

Examples of inorganic fibres are carbide fibres such as silicon carbide fibres, boron carbide fibres, niobium carbide fibres; nitride fibres such as silicon nitride fibres; boron containing fibres such as boron fibres, boride fibres; silicon-containing fibres such as silicon fibres, alumina-boron-silica fibres, E-glass (non-alkaline alumoborosilicate) fibres, C-glass (non-alkaline or low-alkaline soda lime-alumoborosilicate) fibres, A-glass (alkaline soda lime-silicate) fibres, S-glass fibres, CEMFIL-glass fibres, ARG-glass fibres, mineral-glass fibres, non-alkaline magnesia alumosilicate fibres, quartz fibres, silicic acid fibres, silica fibres, high-silica fibres, alumina high-silica fibres, alumo-silicate fibres, aluminium silicate fibres, magnesia alumo-silicate fibres, soda borosilicate fibres, soda silicate fibres, polycarbosilane fibres, polytitanocarbosilane fibres, polysi-lazane fibres, hydridopolysilazane fibres, tobermorite fibres, samarium silicate fibres, wollastonite fibres, potassium aluminium silicate fibres; metal fibres such as iron fibres, aluminium fibres, bismuth fibres, antimony fibres, wolfram fibres, molybdenum fibres, chrome fibres, copper fibres, germanium fibres, rhodium fibres, beryllium fibres, and metal alloy fibres thereof such as bronze fibres, aluminium-nickel alloy fibres, copper-tin alloy fibres, steel fibres; oxide fibres such as zirconia fibres, alumina fibres, magnesia fibres, zinc oxide fibres, indium oxide fibres, titanium oxide fibres, beryllium oxide fibres, nickel oxide fibres, thorium oxide fibres, yttrium oxide fibres, potassium titanate fibres; carbon fibres such as pure carbon fibres, graphite fibres, slagwool fibres, charcoal fibres; sulphide fibres such as zinc sulphide fibres, cadmium sulphide fibres; phosphate fibres such as hydroxyapatite fibres, calcium hydrogen-phosphate (brushite) fibres, neodymium pentaphosphate fibres, and silver phosphate fibres; calcium sulphate fibres: tin iodide fibres; calcium iodate fibres; calcium fluoride fibres; mica fibres such as muscovite fibres, phlogopite fibres, biotite fibres: sodium aluminium hydroxycarbonate fibres; rock-wool fibres such as pure rockwool fibres and basalt rock-wool fibres; processed mineral fibres from mineral wool; volcanic rock fibres; montmorillonite fibres; atapulgite fibres; calcined bauxite fibres; etc.; modified by any chemical or physical processes; and any mixture thereof.

Examples of natural and synthetic organic fibres are aromatic polyamide fibres such as poly(p-benzamide) fibres, poly(p-phenylene-terephthalamide) fibres, poly(p-phenylene-2,6-naphthalamide) fibres, poly(3,4'-diphenylether-terephthalamide) fibres, poly(p-phenylene-(p-benzamide)-terephthalamide) fibres, poly(p-benzhydrazide terephthalamide) fibres, poly(m-phenylene-isophthalamide) fibres, poly(N,N'-m-phenylene-bis(m-benzamide)-terephthalamide) fibres, poly(N,N'-m-phenylene-bis(m-benzamide)-2,6-naphthalamide) fibres, poly(N,N'-m-phenylene-bis(m-benzamide)-4,4'-biphenyl-dicarboxamide) fibres, poly(4,4-bis(p-aminophenyl)-2,2'-bithiazole-isophthalamide) fibres, poly(2,5-bis(p-aminophenyl)-1,3,4-oxa-diazole-iso-phthalamide) fibres, poly(4,4'-diaminobenzanilide-isophthalamide) fibres, poly (2-methyl-p-phenylene-2,6-naphthalamide) fibres, poly(2,6-dichloro-p-phenylene-2,6-naphthalamide) fibres; aromatic polyhydrazide fibres such as poly(terephthalic-m-phenylene-hydrazide) fibres, poly(terephthalic-hydrazide) fibres, poly(p-phenylene-N-methyl-hydrazide) fibres; aromatic polyester fibres such as poly(chloro-1,4-phenylene-ethylene-dioxy-4,4-benzoate-co-terephthalate) fibres, poly (chloro-1,4-phenylene-4,4'-oxydibenzoate) fibres, poly (methyl-1,4-phenylene-4,4'-oxydibenzoate) fibres, poly (chlorophenylene-hexahydroterephthalate) fibres; aromatic polyazomethine fibres such as poly(nitrilo-(2-methyl-1,4-phenylene)nitrilomethylidyne-1,4-phenylenemethylidyne) fibres; aromatic polyimide fibres such as aromatic polypy-romellitimide fibres, aromatic polytrimellitimide fibres, polyester-imide fibres, poly(4,4'-diphenyl-ether-pyromellitimide) fibres; aromatic heterocyclic polymeric fibres such as polybenzimidazole fibres such as poly-(2,2'-(m-phenylene)-5,5'-bibenzimidazole) fibres, polybenzothia-zole fibres such as poly(2-(1,4-phenylene)-2'-(6,6'-bibenzothiazole)) fibres and poly(2-(1,3-phenylene)-2'-(6,6'-bibenzothiazole)) fibres, polybenzoxazole fibres such as poly((1,7-dihydrobenzo(1,2-d:4,5-d')dioxazole-2,6-diyl)-1,4-phenylene) fibres and poly((benzo(1,2-d:4,5-d')bisoxazol-2,6-diyl)-1,4-phenylene) fibres, polyoxadiazole fibres such as polyarylene-1,3,4-oxadiazole fibres; cellulose fibres such as α-cellulose fibres, β-cellulose fibres, mineral cellulose fibres, methylcellulose fibres, cellucotton fibres, regenerated cellulose (rayon) fibres, cellulose acetate fibres, jute fibres, cotton fibres, linen fibres, ramie fibres, sisal fibres, heme fibres, flax fibres, cyanoethylated cellulose fibres, acetylated cellulose fibres; wood fibres such as pine, spruce and fir wood fibres, lignin fibres and fibres of lignin derivatives; rubber fibres and fibres of derivatives of rubber; polyolefin fibres such as polyethylene fibres, polypropylene fibres, polytetrafluoroethylene fibres, polybutadiene fibres; polyacetylene fibres; polyester fibres; acrylic fibres and modified acrylic fibres such as acrylic acid fibres, styrol/acrylate fibres; acrylonitrile fibres such as acrylonitrile fibres and polyacrylonitrile fibres; elastomeric fibres; protein fibres such as casein fibres, maize protein fibres, soybean protein fibres, groundnut protein fibres; alginate fibres; poly (ethylene terephthalate) fibres; polyvinyl alcohol fibres; aliphatic polyamide fibres such as nylon fibres e.g. nylon 6.6 fibres, nylon 6 fibres, nylon 6.10 fibres; poly(phenylene sulphide) fibres; polyvinylchloride fibres; polychloroethene fibres; poly(bisbenzimidazobenzophenanthrolin) fibres; polyoxymethylene fibres; polyurethane fibres; vinyl polymeric fibres; viscose fibres; etc.; modified by any chemical or physical processes; and any mixture thereof.

Preferred examples of fibres are silicon-containing fibres; metal fibres; oxide fibres; carbon fibres; rockwool fibres; processed mineral fibres from mineral wool; volcanic rock fibres; wollastonite fibres; montmorillonite fibres; tobermorite fibres; biotite fibres; atapulgite fibres; calcined bauxite fibres; aromatic polyamide fibres; aromatic polyester fibres; aromatic polyimide fibres; cellulose fibres; wood fibres; rubber fibres and fibres of derivatives of rubber; polyolefin fibres; polyacetylene fibres; polyester fibres; acrylic fibres and modified acrylic fibres; acrylonitrile fibres; elastomeric fibres; protein fibres; alginate fibres; poly (ethylene terephthalate) fibres; polyvinyl alcohol fibres; aliphatic polyamide fibres; polyvinylchloride fibres; polyurethane fibres; vinyl polymeric fibres; and viscose fibres; modified by any chemical or physical processes; and any mixtures thereof.

Especially preferred fibres are E-glass (non-alkaline alumoborosilicate) fibres; C-glass (non-alkaline or low-alkaline soda lime-alumoborosilicate) fibres; mineral-glass fibres; wollastonite fibres; montmorillonite fibres; tobermorite fibres; biotite fibres; atapulgite fibres; potassium aluminium silicate fibres; metal oxide fibres; rockwool fibres; processed mineral fibres from mineral wool; volcanic rock fibres; calcined bauxite fibres and bauxite fibres; aromatic polyamide fibres; aromatic polyester fibres; cellulose fibres; wood fibres; rubber fibres and fibres of derivatives of rubber; polyolefin fibres; polyacetylene fibres; polyester fibres; acrylonitrile fibres; aliphatic polyamide fibres; and polyvinylchloride fibres; ceramic fibres; silicone fibres, and aramide fibres; modified by any chemical or physical processes; and any mixtures thereof.

Especially preferred mineral fibres are mineral-glass fibres, wollastonite fibres, montmorillonite fibres, tobermorite fibres, biotite fibres, atapulgite fibres, calcined bauxite fibres, volcanic rock fibres, bauxite fibres, rockwool fibres, and processed mineral fibres from mineral wool.

Examples of commercially available fibre-types which improve the mechanical properties of, e.g., the Model paint A herein are (average fibre length in gm; average fibre thickness in μm):

1. Inorphil 061-10 ex Laxå Bruk AB (Sweden), synthetic mineral fibre (140;4)
2. Inorphil 161-10 ex Laxå Bruk AB (Sweden), synthetic mineral fibre (140;4)
3. Inorphil 361-10 ex Laxå Bruk AB (Sweden), synthetic mineral fibre (140;4)
4. Inorphil 061-20 ex Laxå Bruk AB (Sweden), synthetic mineral fibre (160;4)
5. Inorphil 461-20 ex Laxå Bruk AB (Sweden), synthetic mineral fibre (160;4)
6. Inorphil 061-30 ex Laxå Bruk AB (Sweden), synthetic mineral fibre (200;4)
7. Inorphil 061-60 ex Laxå Bruk AB (Sweden), synthetic mineral fibre (300;4)
8. RF 5104 ex Lapinus Fibres BV (The Netherlands), volcanic rock fibre (125;5)
9. RF 5118 ex Lapinus Fibres BV (The Netherlands), volcanic rock fibre (650;5)
10. F PA 222/040 ex Schwarzwälder Textil-Werke (Germany), polyamide (500; 15–30)
11. F PA 240/040 ex Schwarzwälder Textil-Werke (Germany), polyamide (500; 15–30)
12. F PA 230/040 ex Schwarzwälder Textil-Werke (Germany), polyamide (500;15–35)
13. F PAC 238/040 ex Schwarzwälder Textil-Werke (Germany), polyacrylonitrile (500;-)
14. F PES 231/040 ex Schwarzwälder Textil-Werke (Germany), polyester/polyamide (500; 10–20)
15. F PP 261/040 ex Schwarzwälder Textil-Werke (Germany), polypropylene (500;21)
16. FB 1/035 ex Schwarzwälder Textil-Werke (Germany), cotton (400,3–12/10–40)
17. FZ 320/040 ex Schwarzwälder Textil-Werke (Germany), paper cellulose (400:20–100)
18. F PAC O 245/040 ex Schwarzwälder Textil-Werke (Germany), polyacrylonitrile preoxidized (500; 10–12)
19. F 501/050 ex Schwarzwälder Textil-Werke (Germany), jute (500;30–500)
20. FG 400/060 ex Schwarzwälder Textil-Werke (Germany), E-glass (230;9–14)
21. FG 400/300 ex Schwarzwälder Textil-Werke (Germany), E-glass (400;9–14)
22. FG 400/100 ex Schwarzwälder Textil-Werke (Germany), E-glass (250;9–14)
23. FG 440/040 ex Schwarzwälder Textil-Werke (Germany), E-glass (150;9–14)
24. F 550/1 S ex Schwarzwälder Textil-Werke (Germany), mineral glass (500;4.4)
25. F 554/1 SR ex Schwarzwälder Textil-Werke (Germany), rockwool (500;5)
26. F 580/1 S ex Schwarzwälder Textil-Werke (Germany), ceramic (500;2.8)
27. Hostapulp ex Schwarzwälder Textil-Werke (Germany), polyethylene (200;-)
28. Sylothix 51 ex Grace AB (Germany), polyethylene (400;-)
29. Sylothix 52 ex Grace AB (Germany), polyethylene+silica (400;-)
30. Sylothix 53 ex Grace AB (Germany), polyethylene+silica (100;-)
31. Arbocel BE 00 ex J. Rettenmaier & Söhne GmbH+Co. (Germany), cellulose (120;20)
32. Arbocel BC 1000 ex J. Rettenmaier & Söhne GmbH+Co. (Germany), cellulose (700;20)
33. Arbocel BWW-40 ex J. Rettenmaier & Söhne GmbH+Co. (Germany), cellulose (200;20)
34. Lignocel C 120 ex J. Rettenmaier & Söhne GmbH+Co. (Germany), conifer (70–150;-)

35. Lignocel C 250 A ex J. Rettenmaier & Söhne GmbH+ Co. (Germany), conifer (150–250;-)
36. Technocel 300 ex C. F. F. Cellulose-Füllstoff-Fabrik (Germany), cellulose (65%<90;-)
37. Technocel 200 ex C. F. F. Cellulose-Füllstoff-Fabrik (Germany), cellulose (80%<90;-)
38. Technocel 150 DU ex C. F. F. Cellulose-Füllstoff-Fabrik (Germany), cellulose (95%<90;-)
39. Technocel 90 DU ex C. F. F. Cellulose-Füllstoff-Fabrik (Germany), cellulose (65%<32;-)
40. Technocel 400 C ex C. F. F. Cellulose-Füllstoff-Fabrik (Germany), cellulose (-;-)
41. Ricen PC ex Montefibre (Italy), acrylonitrile (-;-)
42. Nyad G ex Nyco Minerals (U.S.A), wollastonite (length/diameter ratio 15:1)
43. M 40 ex Mesalles (Spain), rubber (60;-)
44. Tixal 102 ex Tixal (Germany), C-glass (-;-)
45. Tixal 202 ex Tixal (Germany), C-glass (-;-)
46. RCF-600 ex Sumitomo (Japan), C-glass (820;-)
47. RCF-160 ex Sumitomo (Japan), C-glass (250;-)
48. RCF-140 ex Sumitomo (Japan), C-glass (175;-)
49. RCF-140G ex Sumitomo (Japan), C-glass (175;-)
50. RCF-140N ex Sumitomo (Japan), C-glass (175;-)
51. Kevlar Txp (6F542) ex Du Pont (Switzerland), aramide (800;12)
52. Kevlar Txp (6F539) ex Du Pont (Switzerland), aramide (1200;12)

When considering various fibre-containing compositions known in the art of coating, it should be understood that epoxy-materials, e.g. cladding compositions for marine purposes, comprising glass fibres, e.g. E-glass fibres, C-glass fibres, A-glass fibres, S-glass fibres, and ARG-glass fibres, are not to be considered as falling within the scope of the present invention. This is especially due to the fact that the epoxy materials are considered mechanically "strong" in themselves.

The surface of the fibres may or may not have been modified by chemical or physical processes. Examples of such modification processes used to improve the beneficial effects of the fibres are carbonization; silylation; etching such as treatment with alkalimetal hydroxide, treatment with hydrofluoric acid; coating; polyelectrolytic entrapment in the porous surface structures; adsorption processes; hydrogen-bonding processes; esterification processes; cationic bonding processes; anionic bonding processes; polymerisation processes; cross-linking processes; etc. as well as any modification processes included in the manufacturing of the fibres.

When water soluble fibres are incorporated in self-polishing paint coatings, it is envisaged that the surface of the paint coating containing water-soluble fibres may be smoother than that of a coating containing water insoluble fibres, in that the binder components as well as the fibres are eroded away simultaneously. In the present context the term "water soluble fibres" is intended to mean that the fibres, as a major constituent, comprise a material which has a water solubility of at least about 1 mg/kg at 25° C. as determined by ASTM Designation E 1148. Non-limiting examples of such water soluble fibres are zinc oxide fibres, polyvinyl alcohol fibres, protein fibres, acrylic acid fibres, cellulose fibres, etc.

Without being bound to any theory, it is envisaged that the inorganic fibres, in particular the mineral fibres, mentioned above have the most interesting properties with respect to ease of incorporation into the paint (before or after mixing/milling), i.e. the compatibility between the fibres, both in the native form as well as in any surface modified form, and the rosin-based binder system, as well as the polymeric flexibilizer, is favourable.

The preferred fibres for use in the paints according to the invention seem to be fibres which are considerably coarser than fillers or paint additives normally used in antifouling paints. While the present invention is not to be limited to any particular theory, it is believed that even a relatively low volume concentration of such rather coarse fibres will be able to counteract micro cracking during the early phases of the drying/hardening of the paint, and that the thus lower concentration of micro cracks permit the relatively low domain-wise concentration of the relatively coarse fibres to sufficiently efficiently counteract macro cracking. Whether or not this applies, what is most remarkable—and extremely valuable—is that it is possible to counteract the well-known mechanical weakness of rosin and similar materials with concentration of fibres which do not disturb the antifouling or (where applicable) the self-polishing properties of the paint.

Preferred fibres (added to the paint during manufacture) have an average length of 25–2000 $\mu$M and an average thickness of 1–50 $\mu$m with a ratio between the average length and the average thickness of at least 5, especially an average length of 50–500 $\mu$m and an average thickness of 1–25 $\mu$m with a ratio between the average length and the average thickness of at least 10, in particularly an average length of 50–300 $\mu$m and an average thickness of 2–10 $\mu$m with a ratio between the average length and the average thickness of at least 15, such as at least 20. Also, fibres having an average length of 80–200 $\mu$m and an average thickness of 2–20 $\mu$m with a ratio between the average length and the average thickness of at least 10 may advantageously be used.

It can be expected that during the paint manufacture process (see further below), the average length of the fibres will be slightly reduced, e.g., due to the milling process. It is believed that the paint manufacture process should be performed so that the fibres in the ready-to-use paint have an average length of 25–2000 $\mu$m and an average thickness of 1–50 $\mu$m with a ratio between the average length and the average thickness of at least 5, especially an average length of 25–500 $\mu$m and an average thickness of 1–25 $\mu$m with a ratio between the average length and the average thickness of at least 5, in particularly an average length of 25–300 $\mu$m and an average thickness of 2–10 $\mu$m with a ratio between the average length and the average thickness of at least 5. Also, paint containing fibres having an average length of 50–200 $\mu$m and an average thickness of 2–20 $\mu$m with a ratio between the average length and the average thickness of at least 10 may advantageously be used.

The concentration of the fibres is normally in the range of 0.1–30% by solids volume of the paint, such as 0.5–10% by solids volume of the paint. Especially relevant concentrations of fibres, of course depending upon the type and size of the fibres, may be 2–10%, such as 2–7%, or 3–10%, such as 3–8% by solids volume of the paint.

Preferred fibres according to the invention are those which, when incorporated in Model Paint A (as described in Example 1 and in the absence of a polymeric flexibilizer) in an amount of 4 parts by volume and tested in the Laboratory Cracking Test herein, results in a cracking ranking of at least 1, preferably a cracking ranking of at least 2, especially at least 3.

Self-polishing antifouling paints may be combined with biologically active agents (see further below). In this case, self-polishing antifouling paints should be designed to regulate the leaching of biologically active agents by a controlled, and preferably uniform, dissolution of the paint through the entire coating lifetime, usually 2–5 years. The optimal design and performance of self-polishing antifouling paints depends on several variables associated with the ship profile and sailing pattern. Temperature, fouling intensity, salinity, dry-docking intervals, speed, and activity are the main factors that influence the paint behaviour. Thus, it should be possible to tailor make antifouling paint having polishing rates in a wide range so that the paint technology is applicable for a number of different vessel types.

Normally a ship operating at low speed with very low activity in an area of a high fouling intensity, e.g. a container ship sailing on Singapore, will need a relatively fast self-polishing antifouling paint, e.g. having a polishing rate in the range of 10–30 μm per 10,000 Nautical miles, in order to release sufficient amounts of biologically active agents to keep the hull clean. On the other hand a ship operating at high speed with very high activity in an area of a low to moderate fouling intensity, e.g. coastal fishing vessels in Iceland, will need a relatively slow self-polishing antifouling paint, e.g. having a polishing rate in the range of 1–3 μm per 10,000 Nautical miles.

Different types of rosin and rosin equivalents have different sea-water solubility and softening points as will be obvious for the person skilled in the art. The polishing properties of a paint are, i.α., depending on the amount and hydrophilicity of the polymeric flexibilizer and the amount and type of rosin and rosin equivalents.

Thus, a requirement to the paint technology introduced with the present invention it that it should be possible to adjust the polishing rate in a range of, e.g. 1–50 μm per 10,000 Nautical miles, by varying the relative amounts of the binder component(s), especially rosin and rosin equivalent(s), and the flexibilizer component(s).

In the present context the term "rosin-based binder system" is intended to mean the binder phase of a paint consists of at least 30%, by solids volume of the binder system as a whole, of rosin or rosin equivalent(s). As a balance, the rosin-based binder system comprises up to 70%, by solids volume of the binder system as a whole, of one or several further binder components. Examples of such further binder components are:

oils such as linseed oil and derivatives thereof; castor oil and derivatives thereof; soy bean oil and derivatives thereof;

polymeric binder components such as saturated polyester resins; polyvinylacetate, polyvinylbutyrate, polyvinylchloride-acetate, copolymers of vinyl acetate and vinyl isobutyl ether; vinylchloride; copolymers of vinyl chloride and vinyl isobutyl ether; alkyd resins or modified alkyd resins; hydrocarbon resins such as petroleum fraction condensates; chlorinated polyolefines such as chlorinated rubber, chlorinated polyethylene, chlorinated polypropylene; styrene copolymers such as styrene/butadiene copolymers, styrene/methacrylate and styrene/acrylate copolymers; acrylic resins such as homopolymers and copolymers of methyl methacrylate, ethyl methacrylate, n-butyl methacrylate, isobutyl methacrylate and isobutyl methacrylate; hydroxy-acrylate copolymers; polyamide resins such as polyamide based on dimerized tall oil fatty acids; cyclized rubbers; epoxy esters; epoxy urethanes; polyurethanes; epoxy polymers; hydroxy-polyether resins; polyamine resins; etc., as well as copolymers thereof.

The polymeric binder components have for the purpose of the present invention certain characteristics with respect to glass transition temperature, so that these components, in combination with the rosin or rosin equivalent(s), the polymeric flexibilizer(s), and any other necessary or desirable paint constituents, are able to form a rigid paint film. Thus, each of the polymeric binder components has, as a matter of definition, a glass transition temperature ($T_g$) of more than 25° C. Preferably, the $T_g$ of each of the polymeric binder components is at least 30° C.

Each of the individual further binder components may be self-polishing or non-soluble.

In the present context, the term "rosin" is intended to mean gum rosin; wood rosin of grades B, C, D, E, F, FF, G, H, I, J, K, L, M, N, W-G, W-W (as defined by the ASTM D509 standard); virgin rosin; hard rosin; yellow dip rosin; NF wood rosin; tail oil rosin; or colophony or colophonium; as well as any of the single constituents of natural rosin qualities, e.g., abietic acid, abietinic acid, sylvic acid, dihydroabietic acid, tetrahydroabietic acid, dehydroabietic acid, neoabietic acid, pimaric acid, laevopimaric acid, isopimaric acid, sandaracopimaric acid, palustric acid, dextro-pimaric acid, isodextro-pimaric acid, dextro-pimarinal, isodextro-pimarinal, xanthoperol, tatarol, podocarpic acid, phyllocladen, sugiol, ferruginol, himokiol, manool, manoyloxide, ketomanoyloxide, cativinic acid, eperuanic acid and all other rosin components based on the diterpene skeleton of abietic acid; as well as any mixtures thereof. It is understood that the term "rosin" may indicate any mixtures of the chemical species mentioned above as well as any of the chemical species as such.

In the present context the term "rosin equivalents" is intended to mean all types of rosin (as defined above) modified or derivatised according to any of the following chemical reactions or processes: polymerisation/oligomerisation; esterification; metal salt formation/formation of metallic resinates; ammonium salt formation; decarboxylation; hydrogenation; dehydrogenation-hydrogenation/disproportionation/dismutation; addition; oxidation; isomerisation; acylation; alkylation; amidation; arylation; Diels-Alder reactions such as maleinisation and fumarisation; 1,3-dipolar addition; epoxidation; formylation; hydrocarboxylation; hydroboration; halogenation; hydration; hydroformylation; hydroxylation; hydrometallation; oxyamination; reduction; sulphonation; aminomethylation; dicarbalkoxylation; ozonolysis; as well as mixtures thereof.

A number of the above-mentioned reactions or processes are expected to lead to rosin equivalents which have superior paint constituent properties with respect to improvement of the mechanical properties and/or control of the self-polishing properties in that the water-solubility and/or the reactivity of the thus modified rosin qualities have been altered. Thus, it is believed that polymerisation/oligomerisation, metal salt formation/formation of metallic resinates, ammonium salt formation, hydrogenation, dehydrogenation-hydrogenation/disproportionation/dismutation, Diels-Alder reactions such as maleinisation and fumarisation, and isomerisation will lead to rosin equivalents which are especially advantageous for the antifouling paints according to the invention.

As examples of commercially available rosin and rosin equivalents can be mentioned:

(a) rosins: Chinese Gum Rosin WW ex China National Export (China); Colophony Ia ex Ciech (Poland); Gum Rosin WW ex Resipez (Portugal); Portuguese WW ex A.V. Pound & Co. Ltd (U.K.); Honduras Balsamharz X ex C. E. Roeper (Germany); Breu WW ex Resiprates (Brazil); Breu WW, No. 2 ex Markit (Brazil); Colofast Breu WW ex Shell (Brazil); Portuguese Gum Rosin Grade WW ex Calo Chemicals Inc. (U.S.A.); China Gum Rosin, Grade X ex Harima Kasei (Japan) Breutex ex Eucartex (Brazil); Colofonia WW ex Adrizyl (Brazil); Brazilian Y/2A Gum Rosin ex A.V. Pound & Co. Ltd (U.K.); Breutex Gum Rosin WW/X ex Hermann Ter Hell & Co (Germany); Portuguese Balsamharz WW ex Hermann Ter Hell & Co (Germany); Sailboat Brand Rosin ex Wuping Country Forest Products Chemical Factory, Qunzhhou, Fujing Province (China); Resigral ex DRT (France); Gum Rosin High Grade WW/WG ex Dr. R. A. Stepanian (Austria);

(b) metal resinates: Terpenato 620 NN50 ex RESISA (Spain); Terpenato ND-0872 ex RESISA (Spain); Terpenato 670 ex RESISA (Spain); Bevires 130 ex BERGVIK (Sweden); Magnesiumhartharz V 112 ex Robert Kraemer (Germany); Oulu 362 ex EITSILUOTO OY (Finland); MKK-1678 ex VEITSILUOTO OY (Finland);

(c) polymerized rosin: Erkapol 220 ex ROBERT KRAEMER (Germany); Erkapol 209 ex ROBERT KRAEMER (Germany); Colophane Dismutee H ex GRANEL MUNOZ (Spain); Residis polymer ex URE (Spain); K-10 ex DRT (France); Bremar 85/7 ex ROBERT KRAEMER (Germany); Polyharz 9566 A/60 ex ROBERT KRAEMER (Germany); Polyresin 6012 ROBERT KRAEMER (Germany); Bevitack 95X ex BERGVIK (Sweden); Bevitack 115 ex BERGVIK (Sweden); Bevitack HA ex BERGVIK (Sweden); Bevitack 320 ex BERGVIK (Sweden); Dertopol ex DRT (France); Dimerex ex HERCULES (Holland); Poly-Pale ex HERCULES (Holland); Sylvatac 95 ex ARIZONA CHEMICALS (U.S.A.); Oulumer 70 ex VEITSILUOTO OY (Finland);

(d) metal resinates of polymerized rosin: Resifor 205 ex URE (Spain); Erkazit L ex ROBERT KRAEMER (Germany);

(e) hydrogenated or partially hydrogenated rosin: Resin SH ex Andreas Jennow (Denmark); Resin H ex Andreas Jennow (Denmark); Foral AX ex HERCULES (Holland); Foral AX-E ex HERCULES (U.S.A.); Foralyn Resin ex HERCULES (Holland); Hydrogral ex DRT (France); Pinecrystal KR-85 ex ARAKAWA CHEMICAL INC (U.S.A.); KR-612 ex ARAKAWA CHEMICAL INC (U.S.A.); Hypale ex ARAKAWA CHEMICAL (U.S.A.); STAYBELITE ex HERCULES (Holland); STAYBELITE 570 ex HERCULES (Holland); Chinese Hydrogenated Rosin ex A.V. Pound & Co. Ltd. (U.K.); Foralyn ex HERCULES (Holland); Hydrogenated Gum Rosin ex Necarbo (Holland);

(f) esters of hydrogenated rosins: Foralyn 90 ex HERCULES (Holland);

(g) dismutated or disproportionated rosins: Resin 731 D ex HERCULES (Holland); Residis ex URE (Spain); Residis 455 ex URE (Spain); Gresinox ex DRT (France); Recoldis ex GRANEL Y MUNOZ (Spain); Recoldis A ex GRANEL MUNOZ (Spain); Dispro Rosin ex ARAKAWA CHEMICAL INC (U.S.A.); Gresinox 511 ex GRANEL MUNOZ (Spain); Gresinox 578 M ex GRANEL MUNOZ (Spain); Unitac 68 ex UNION CAMP (U.K.); and (h) other types of modified rosins: Resin B 106, Acid modified ester ex HERCULES (Holland); Resiester F-110, Fumaric acid rosin adduct partially esterified ex URE (Union Resinera) (Spain); Resiester GR-51, Maleic rosin adduct esterified with glycerol ex URE (Spain); Resiester MR, Monoethyleneglycol ester of rosin ex URE (Spain); Resiester R-10, Monoethyleneglycol ester of maleic rosin adduct ex URE (Spain); Colmodif 295 F, Fumaric acid rosin adduct ex URE (Spain); Colmodif R-230, Maleic anhydride rosin adduct ex URE (Spain); Resiester C, Fumaric acid rosin adduct partially esterified ex URE (Spain); Colmodif R-330, Maleic anhydride rosin adduct ex URE (Spain); Rokrapal SH, Phenolic modified rosin ex ROBERT KRAEMER (Germany); Rokrasin 839, Glycerol ester of rosin ex ROBERT KRAEMER (Germany); Oulumer 75 E, Partially polymerized tall oil rosin and esterified with pentaerythritol ex VEITSILUOTO OY (Finland); Oulumer 85 E, Partially polymerized and esterified tall oil rosin ex VEITSILUOTO OY (Finland); Sylvatac RX, Stabilized tall oil rosin ex ARIZONA CHEMICALS (U.S.A.); Zonester 65, Pentaerythritol ester of disproportionated tall oil rosin ex ARIZONA CHEMICALS (U.S.A.).

Rosin and rosin equivalents with free acidic groups (e.g. carboxylic acid groups) are able to react with other paint ingredients susceptible to interactions with an acidic functionality, i.e. by salt formation. Examples of such possible interacting paint ingredients are inorganic oxides and hydroxides such as zinc oxide, cuprous oxide, and calcium hydroxide, leading to the zinc, copper, and calcium salts, respectively. Furthermore, rosin or rosin equivalents may also react with ammonia and organic compounds, e.g. amines, which will leave the acidic group of the rosin or rosin equivalent(s) in the form of an ammonium salt. This being said, it is envisaged that chemical reaction/modification of the rosin or rosin equivalent(s) may take place either before mixing of the component, i.e. by using metal resinates or other resinates, or after mixing of the paint component, i.e. by reaction between some of the paint components and the rosin or rosin equivalent.

Thus, the term "rosin equivalents" is of course also intended to include any reaction products formed by reaction between the rosin or rosin equivalent contained in the composition and any other of the components of a paint composition, e.g. copper resinate which is a reaction product of cuprous oxide and rosin.

The advantages by using metal resinates instead of rosin or rosin derivatives as such are, e.g., faster drying and increased hardness of the paint compared to the same paint with unreacted rosin. Thus, in a preferred embodiment of the present invention, the rosin part of the antifouling paint according to the invention comprises one or more of the following metal salts of rosin: zinc resinate, copper resinate, aluminium resinate, calcium resinate, and magnesium resinate, preferably at least zinc resinate, copper resinate, and calcium resinate, or a combination of such metal salts. Such salts may be formed in situ when mixing rosin with other paint constituents or may be used as such.

Furthermore, it is envisaged that other resinates, e.g. ammonium resinates, may possess properties which can be advantageous for the antifouling paints of the present invention. An illustrative example of an amine which can react with a rosin or rosin equivalent to the corresponding ammonium resinate is the biologically active agent 2-methylthio-4-tert-butyl-amino-6-cyclopropylamine-s-triazine. It should be understood, that a combination of metal salts and ammonium salts is possible within the meaning of the present invention. In a further embodiment of the present invention, the rosin part of the paint comprises one or more ammonium salts.

In the present context, the term "rosin or rosin equivalent(s)" is intended to mean any of the individual components comprised within the meaning of "rosin" and "rosin equivalent(s)" as well as any mixtures thereof.

Several different qualities of rosin are commercially available for different purposes, cf. the list above. In order to obtain a paint composition which is sufficiently stable to weathering, e.g. exposure to light and oxidation by atmospheric or sea-water dissolved oxygen, it may be advantageous to use rosin or rosin equivalents wherein the content of rosin and rosin equivalent components having carbon—carbon double bonds susceptible to oxidation is low. Looking at the abietic acid skeleton, the tendency to reaction with, e.g., oxygen is related to the presence of conjugated carbon—carbon double bonds; i.e. abietic acid has two double bonds sensitive to oxidation.

One way of estimating the content of non-aromatic double bonds (or actually the degree of unsaturation) in a rosin sample (e.g. 100 mg/mL dissolved in $CDCl_3$) is by using $^1$H-NMR techniques. The intensity of resonances arising from hydrogen atoms bound to unsaturated (but not aromatic) carbon atoms (in the range $\delta 4.8$–$5.3$ relative to tetramethylsilane (TMS)) relative to the intensity of resonances arising from hydrogen atoms bound to saturated carbon atoms (in the range $\delta 0.5$–$2.5$ relative to TMS; 100%) is believed to be a suitable and reliable measure for the content of unsaturated carbon—carbon bonds (non-aromatic double bonds) and, thus, also for the tendency for the rosin sample to become oxidised. The determination of the intensities can easily be performed by using NMR spectrometers operating at at least 200 MHz in combination with signal integration software as realised by the person skilled in the art.

With respect to the degree of unsaturation (as discussed above), it is believed that the unsaturation value for natural sources of rosin is around 6%. Thus, it is believed that advantageous qualities of rosin are those which have an unsaturation value of less than 6%, such as less than 5%, preferably less than 4%, especially less than 3.5%, in particular less than 3%.

Furthermore, in a preferred embodiment of the present invention, the rosin or rosin equivalent(s) comprise(s) less than 40% by weight of abietic acid, preferably less than 30% by weight, such as less than 20% by weight, in particular less than 15%, such as less than 10%, by weight of abietic acid.

As abietic acid is not the sole compound having two conjugated double bonds (neoabietic acid, palustric acid, and levopimaric acid are other examples), it is preferred that the rosin or rosin equivalent(s) used in the paint according to the present invention comprise(s) less than 50% of abietic acid-type compounds (i.e. compounds having the abietic acid tetracyclic skeleton) having two conjugated double bonds, preferably less than 40%, such as less than 30%, in particular less than 20%, such as less than 15% of abietic acid-type compounds having two conjugated double bonds.

Determination of the content of abietic acid and abietic acid-type compound may be performed by using ultraviolet spectroscopy (UV) techniques or infrared spectroscopy (IR) (preferably Fourier transformation IR) techniques as realised by the person skilled in the art, e.g. as described in Naval Stores (Stump, J. H. ed.), Chapter 25: Quality Contol Call oil, rosin and fatty acids), page 860, and ASTM Designation D 1358–86.

The binder system as a whole comprises, as a matter of definition, at least 30%, by solids volume of the binder system, of rosin or rosin equivalents. It is preferred that the amount of rosin or rosin equivalent(s) is higher than 30%, such as 40% or higher, by solids volume of the binder system, in particular 50% or higher, such as 60% or higher, by solids volume of the binder system, or even higher such as 70% or higher by solids volume of the binder system. In an interesting embodiment of the present invention, the content of rosin or rosin equivalent(s) in the binder system is in the range of 85–100%.

It is clear that the remaining part of the rosin-based binder system is constituted by further binder components, such as oils and polymeric binder components. Thus, the content of further binder components is (by definition) 70% or less by solids volume of the binder system. Preferably, the content is 60% or less, such as 50% or less, especially 40% or less, or even 30% or less by solids volume of the binder system. In particular embodiments, the content is 0–15% by solids volume of the binder system.

In a further preferred embodiment of the marine antifouling paint according to the invention, the amount of rosin or rosin equivalent(s) is in the range of 15–80% by solids volume of the paint, more preferably 20–70%, such as 20–60%, by solids volume of the paint, in particular 25–60%, such as 25–50%, by solids volume of the paint.

Furthermore, it is preferred that the further binder components constitute 0–20% such as 0–15%, in particular 0–10% by solids volume of the paint.

With respect to the total amount of binder components, i.e. rosin or rosin equivalents, oils, and polymeric binder components (all in all called the binder system), it is preferred that the binder system is present in the paint in an amount of 15–80%, preferably 20–70%, such as 25–60%, in particular 35–60%, such as 35–50% by solids volume of the paint.

It has proved useful to utilise the rosin or rosin equivalent in the form of the metal salt, e.g. in the form of the zinc, copper, or calcium salt. Thus, in a preferred embodiment of the invention, at least a part of the rosin or rosin equivalent is in the form of the metal resinate and the amount of metal resinates is preferably higher than 20% by solids volume of the rosin-based binder system, preferably higher than 30%, such as higher than 40%, by solids volume of the binder system, in particular higher than 50%, such as higher than 60%, by solids volume of the binder system.

In a preferred embodiment of the marine antifouling paint according to the present invention the rosin-based binder system as a whole, i.e. rosin and rosin equivalent(s) and any further binder components, is of a hydrophilic kind or is rendered hydrophilic by chemical or physical processes (e.g. hydrolysis and complexation) when incorporated in the paint or when contacted with the marine environment (e.g. hydrolysis, exchange of ions, or mechanical erosion). Either by inherence or by one or more of these processes the antifouling paint as a whole is rendered self-polishing.

In the present context the term "hydrophilic binder system" is intended to mean that the component in question is characterised by having a surface tension in the range of 30–80 mN/m such as 30–70 mN/m, preferably 40–80 mN/m, especially 50–80 mN/m, such as 60–80 mN/m.

An important and interesting feature of the antifouling paints of the present invention is the presence of a polymeric flexibilizer, which is used for adjusting the mechanical properties of the rosin-based binder system as well as the polishing properties of the paint. In the present context it should be understood that the term "polymeric flexibilizer" relates to one or several of the polymeric flexibilizer components defined below.

In order to distinguish the polymeric flexibilizers from the polymeric binder components, the glass transition temperature ($T_g$) of the polymeric flexibilizer component(s) is by definition at the most 25° C.

The polymeric flexibilizer component(s) can be selected from any polymer class which can be tailored by appropriate choice of monomers to have a glass transition temperature at the most 25° C.; however, it is believed that polymers derived from monomers from the following monomer classes are of special interest:

alkenes such as ethene, propene, and butene;
perhaloalkenes such as tetrafluoroethylene;
dienes such as halo-1,3-butadiene, alkyl-1,3-butadiene such as isoprene, and alkoxy-1,3-butadiene;
acrylates and methacrylate known as (meth)acrylates) such as $C_{1-18}$-alkyl (meth)acrylates e.g., methyl (meth) acrylate, ethyl (meth)acrylate, 1-propyl (meth)acrylate, 2-propyl (meth)acrylate, 1-butyl (meth)acrylate, 2-butyl (meth)acrylate, iso-butyl (meth)acrylate, and tert-butyl (meth)-acrylate; cycloalkyl (meth)acrylate e.g. cyclohexyl (meth)acrylate; haloalkyl (meth)acrylates e.g. 2-chloroethyl (meth)acrylate; hydroxy-$C_{1-10}$-alkyl (meth)acrylates e.g. 2-hydroxyethyl (meth)-acrylate, 1-hydroxy-2-propyl (meth)acrylate, and 2-hydroxy-1-propyl (meth)acrylate; alkoxyalkyl (meth)acrylates e.g. methoxyethyl (meth)acrylate and ethoxyethyl (meth)acrylate; benzyl (meth)acrylates and substituted analogues hereof, e.g. analogues substituted one, two or three time on the benzene ring with $C_{1-7}$-alkyl, $C_{1-7}$-alkoxy, hydroxy, thio, cyano, nitro, or halogen; and polyoxy-$C_{1-5}$-alkylene (meth)acrylate, e.g. polyoxyethylen(meth)acrylate and polyoxypropylene-(meth)acrylate;
styrenes such as styrene and α-methylstyrene optionally substituted in the 2-, 3-, or 4-position with $C_{1-7}$-alkyl, $C_{1-7}$-alkenyloxy, $C_{1-7}$-alkoxy, hydroxy, thio, cyano, nitro, or halogen;
acrylamides (acrylamides as well as methacrylamides) such as acrylamide, N-$C_{1-7}$-alkyl-acrylamide e.g. N-methylacrylamide, N-ethylacrylamide and N-propylacrylamide, N-$C_{1-7}$-dialkyl-acrylamide e.g. N,N-diethylacrylamide, N-hydroxy-$C_{1-7}$-alkylacrylamide e.g. N-methylol-acrylamide, and N-$C_{1-7}$-alkoxy-$C_{1-7}$-alkylacrylamide, e.g. N-tert-butoxymethyl-acrylamide;
vinyl ethers such as vinyl methyl ether, vinyl ethyl ether, vinyl propyl ether, vinyl ethylbutyl ether, vinyl hexyl ether, vinyl 2-ethylhexyl ether, and vinyl cyclohexyl ether;
allyl ethers such as allyl methyl ether, allyl ethyl ether, allyl propyl ether, allyl hexyl ether, allyl 2-ethylhexyl ether, allyl cyclohexyl ether, and polyoxyalkylene allyl ether such as polyoxyethylene allyl ether;
maleic acid, fumaric acid, and maleic anhydride, as well as derivatives thereof; and
vinyl esters such as vinyl esters of $C_{2-20}$ linear or branched alkanoic, alkenoic, and alkadienoic acids.

It should be understood that the above-mentioned monomers may be included in homopolymers as well as in copolymers. Monomers from the same class as well as monomers from different classes may give rise to such copolymers as will be clear for the person skilled in the art.

It is believed that the following homopolymers and copolymers are especially relevant as examples of polymeric flexibilizer components within the present invention:

polyalkenes such as polyethylene, polypropylene, and polybutene;
polydienes such as poly(halo-1-butenylene), poly(alkyl-1-butenylene), and poly(alkoxy-1-butenylene);
poly(meth)acrylates (polyacrylate-type polymers) such as polymers of the acrylate and methacrylate monomers mentioned above; as well as acrylate, methacrylate, and acrylate/methacrylate copolymers, preferably random copolymers;
polystyrenes such as polymers and copolymers of the styrene monomers mentioned above, as well as copolymers of the above-mentioned styrene monomers and the above-mentioned (meth)acrylate monomers;
polyacrylamides such as polymers and copolymers of the acrylamide monomers mentioned above;
copolymers and terpolymers of the above-mentioned acrylamide and methacrylate monomers and the above-mentioned (meth)acrylate and styrene monomers, e.g. acrylic acrylamide resins such as poly(styrene-co-acrylate esters-co-acrylamides) and poly(ethylacrylate-co-styrene-co-acrylamides);
("polyacrylamide-type" polymers refers to the polymers defined above under "polyacrylamides" and "copolymers and terpolymers . . . ")
fluoro polymers;
polyvinyl ethers polyvinyl ether-type polymers) of the vinyl ethers mentioned above, and copolymers thereof, preferably random copolymers; and
polyvinyl esters such as esters of $C_{2-20}$ linear and branched alkanoic, alkenoic, and alkadienoic acids, and copolymers thereof, preferably random copolymers, e.g. poly(vinyl acetate-co-vinyl laurate).

Furthermore, the flexibilizer component(s) may also be selected from other types of polymers, e.g. condensation polymers, such as polyoxy-$C_{1-5}$-alkylenes and analogues thereof substituted with $C_{1-7}$-alkoxy, halogen, cyano; polyesters such as polyesters from aliphatic saturated or mono- or diunsaturated as well as cycloaliphatic and aromatic $C_{4-30}$-di-, tri-, or tetracarboxylic acids and $C2_{15}$-α,ω-dihydroxyalkanes such as propanediol, butanediol, and pentanediol, trihydroxyalkanes such as glycerol, polyhydroxyalkanes, and polyoxyalkylenediols, -triols, and tetraols, such as polyoxyethylenediols, polyoxyethylenetriols, polyoxyethylenetetraols, polyoxypropylenediols, polyoxypropylenetriols, polyoxypropylenetetraols, polyoxyethylene-co-polyoxypropylenediols, polyoxyethylene-co-polyoxypropylenetriols, polyoxyethylene-co-polyoxypropylenetetraols, and polyoxybutylenediols; saturated polyesters, saturated hydroxyl, low branched polyesters, unsaturated polyesters, and oil-free polyesters; as well as any other polyesters known to the person skilled in the art, e.g. the polyesters described in F. Pilati "Comprehensive Polymer Science. The Synthesis, Characterization, Reactions & Application of Polymers", Sir Geoffrey Allen (ed.), Volume 5, 1989, pp 275–329 and A. Fradet, ibid., pp 331–344;
aromatic and aliphatic reacted and unreacted polyurethanes and hydroxy derivatives hereof, such as elastomeric polyurethanes; as well as any other polyurethanes known to the person skilled in the art, e.g. the polyurethanes described in K. C. Frisch and D. Klempner, ibid., pp 413–426;
polysulfides such as poly(thio-isobutylene), poly(thiomethylane), poly(thio-propylen), poly(oxyethylene, dithioethylene), poly(oxyethylene,thioethylene), as well as any of the well know polysulfides illustrated by the ones described in Vietti, D. E. pp 533–542;
polyamides, e.g. the polyamides described in R. J. Gaymans and D. J. Sikkema, ibid., pp 357–373 and L. Wollbracht, ibid., pp 375–386;

polyimines such as polyethyleneimine as well as any other polyimines known to the person skilled in the art, e.g. the polyimines described in B. Sillion, ibid., pp 499–532;

epoxy esters such as epoxy-modified alkyd resins e.g. short oil epoxy esters and epoxy-modified conjugated drying fatty acids;

polysiloxanes such as aliphatic and aromatic substituted polysiloxanes; and as well as any of the condensation polymers described in the applicants' publication WO 96/14362.

Especially interesting polymers among those are: poly (meth)acrylates, polyacrylamides as well as copolymers and terpolymers hereof, acrylamide resins, acrylic acrylamide resins, polyvinyl ethers, polyvinyl esters, polyesters, polyoxy-$C_{1-5}$-alkylenes, polyurethanes, and epoxy esters.

Particularly interesting polymers are polymers of the following types: polyvinyl ether-type, polyacrylamide-type, and polyacrylate-type.

It is believed that copolymers of all of the above polymer-types may be used; however, it is envisaged that in these cases random copolymers may be especially advantageous due to the lesser tendency to crystallinity. Furthermore, for random copolymers only one $T_g$ can be measured.

Examples of interesting commercially available polymeric flexibilizers are PLEXISOL B-372 ex RÖHM, Germany, PARALOID C-10 LV ex ROHM & HAAS, U.S.A., ALBURESIN HA 14 ex ALBUS, Spain, SYNOCRYL 7013 ASB and SYNOCRYL 839S ex CRAY VALLEY, Spain, LTW RESIN ex HÜLS, Germany, URACRON CS 106 XB, URACRON CS 104 M, URAFLEX EU 66 N, URAFLEX EU 110 M1, URAFLEX EU 221 M1 ex DSM, Holland, JÄGALYD FES 421 and JAGOTEX F 238 ex JÄGER, Germany, LUMIFLON 552, NEOREZ U-480, and NEOREZ U-322 ex ZENECA, Spain, LUTONAL M40 ex BASF, Germany, LARODUR 103 RB ex BASF, Germany, WORLÉEDUR MF 45 and WORLÉEDUR D 46 ex WORLÉE, Germany, and VINNAPAS B 100/20 VL and VINNAPAS B 500/20 VL ex WACKER, Germany.

The homopolymers and the copolymers mentioned above can, if they are not commercially available, be prepared by methods known within the field of polymer technology.

It has been found that the polymeric flexibilizers have to fulfil certain criteria with respect to their glass transition temperature and their weight average molecular weight in order to express the full scope of the rosin-based antifouling paints according to the invention.

Thus, the glass transition temperature ($T_g$) of the polymeric flexibilizer component(s) is (as mentioned above) by definition below 25° C. Preferably $T_g$ is in the range of –45 to 25° C., such as in the range of –45 to 0° C., more preferably in the range of –45 to –25° C., such as –40 to –30° C. for some of the polymers, or in the range of –40 to –20° C., such as –35 to –25° C., or even in the range of –20 to 0° C., such as –15 to –5° C. Also the $T_g$ range of –30 to 25° C. may be applicable of some of the polymers.

In the case where at least one component of the polymeric flexibilizer, preferably the majority of the components, is of the polyvinyl ether-type, the glass transition temperature ($T_g$) of such components is preferably the range of –40 to –20° C.

Alternatively, if at least one component of the polymeric flexibilizer, preferably the majority of the components, is of the polyacrylamide-type, the glass transition temperature ($T_g$) of such components is preferably the range of –30 to 25° C., e.g. in the range of –30 to –10° C. or in the range of 0 to 25° C.

Furthermore, in the case where at least one component of the polymeric flexibilizer, preferably the majority of the components, is of the polyacrylate-type, the glass transition temperature ($T_g$) of such components is preferably the range of –30 to 0° C.

As a matter of definition, the weight average molecular weight of the polymeric flexibilizers is at least 1,000.

Generally, the weight average molecular weight of the polymeric flexibilizer components should preferably be at least 2,000, in particular in the range of 2,000–250,000, such as in the range of 5,000–200,000, preferably in the range of 7,000–175,000.

Furthermore, it is believed that the polymeric flexibilizer components should be non-crystalline compounds in order for the function of the polymeric flexibilizer compound to be fully expressed.

In a preferred embodiment of the present invention the polymeric flexibilizer constitutes at least 0.5% by solids volume of the paint, preferably 0.5–40% by solids volume of the paint, such as 1–20% by solids volume of the paint, in particular 2–20%, such as 2–15% by solids volume of the paint.

Preferred polymeric flexibilizer components according to the invention are those which, when incorporated in Model Paint A and tested in the Laboratory Cracking Test herein (see Example 1), results in a cracking ranking of at least 3, preferably a cracking ranking of at least 4.

Thus, the present invention also relates to a marine antifouling paint comprising a binder system which comprises at least 30% by solids volume of rosin or rosin equivalent(s), the binder system being present in the paint in such an amount and having such a composition that the paint when tested in (a) the Laboratory Cracking Test herein results in a ranking of below 5, or (b) the Steel Panel Elongation Test herein show micro or macro cracking when elongated 4 mm in the absence of any principle counteracting the mechanical deficiency, the paint further comprises (a) one or more kind of fibres, which, when incorporated in Model Paint A (as described in Example 1 (in the absence of a polymeric flexibilizer)) in an amount of 4 parts by volume and tested in the Laboratory Cracking Test herein, result in a cracking ranking of the Model Paint A of at least 1; and (b) one or more polymeric flexibilizer components, which, when incorporated in Model Paint A (as described in Example 1 and tested in the Laboratory Cracking Test herein), result in a cracking ranking of the Model Paint A of at least 3.

A preferred embodiment of the marine antifouling paint according to the present invention is a paint wherein the rosin-based binder system (rosin and rosin equivalent(s) and any further binder components) combined with the polymeric flexibilizer component(s) have a polishing rate of at least 1 μm, such as in the range 1–50 μm, per 10,000 Nautical miles, preferably at in the range of 1–30 μm:

60%, by solids volume, of a mixture of the rosin-based binder system and the polymeric flexibilizer in the relevant relative amounts 26%, by solids volume, of zinc oxide (see Model Paint A)

10%, by solids volume, of cuprous oxide (see Model Paint A)

4%, by solids volume, of thixotropic bentonite (see Model Paint A)

and tested in the Polishing Rate Test herein.

Although the principle of using a polymeric flexibilizer was originally developed for fibre-containing paints having a high content of rosin or rosin equivalent(s), it has also been demonstrated (see Example 1) that the polymeric flexibilizer may be used alone, i.e. in paints containing no fibres, for counteracting the mechanical deficiencies of paints comprising a rosin-based binder system. Thus, it is believed that a number of polymeric flexibilizer can modify (improve) the mechanical properties of a rosin-based binder system in a way that makes the polymeric flexibilizers useful in their own right. Thus, it is envisaged that the principles, combinations, and ranges stated herein in connection with the combination of fibres and flexibilizers are equally applicable in the cases where flexibilizers are used alone.

Referring to the above-mentioned list of suitable polymeric flexibilizer components, it is envisaged polyacrylamides as well as copolymers and terpolymers of (meth) acrylate, styrene, and acrylamide monomers, acrylamide resins, acrylic acrylamide resins, polystyrene, polyvinyl ethers, polyvinyl esters, polyamides, polyimines, polyesters, polyoxyalkylenes, polyurethanes, and epoxy esters are especially relevant when used in high rosin-content antifouling paint without fibres.

As the paints according to the present invention are antifouling paints, it is often advantageous to incorporate at least one biologically active agent in the paint in order to further enhance the antifouling properties.

In the present context the term "biologically active agent" is intended to mean any chemical compound or mixture of chemical compounds which has the capability of suppressing the settlement and/or growth of marine organisms, to any substrate containing the biologically active agent. The suppression can be executed by any mechanism lethal to the organisms, by any mechanism resulting in deterrence and/or repellence of the organisms with or without causing mortality or by any mechanism inhibiting the settlement of the organisms with or without causing mortality.

Examples of biologically active agents are:
organometals such as trialkyltin salts such as hydroxytriphenylstannane, dibutylbis(1-oxododecyloxy)-stannane, fluorotriphenylstannane, chlorotriphenylstannane, tributylfluorostannane, and tributyltin maleate; hexabutyldistannoxane; trialkyltin copolymers such as tributyltin resinate, tributyltin acrylate copolymer, and tributyltin methacrylate copolymer; metallo-dithiocarbamates such as bis(dimethyldithiocarbamato)zinc, ethylene-bis(dithiocarbamato)zinc, ethylene-bis(dithiocarbamato) manganese, and complexes between these; bis(1-hydroxy-2(1H)-pyridinethionato-O,S)-(T-4) copper; copper acrylate; bis(1-hydroxy-2(1H)-pyridinethionato-O,S)-(T-4) zinc; phenyl(bispyridyl)-bismuth dichloride; tributyltinoxide; tributyltinfluoride; triphenyltinfluoride;

metal biocides such as copper, copper metal alloys such as copper-nickel alloys; metal oxides such as cuprous oxide and cupric oxide (even though e.g. cuprous oxide and cupric oxide may have pigment characteristics, it is understood that in the present context such biologically active agents are only considered as "biologically active agents"); metal salts such as cuprous thiocyanate, barium metaborate, and copper sulphide;

heterocyclic nitrogen compounds such as 3a,4,7,7a-tetrahydro-2-((trichloromethyl)-thio)-1H-isoindole-1,3(2H)-dione, pyridine-triphenylborane, 1-(2,4,6-trichlorophenyl)-1H-pyrrole-2,5-dione, 2,3,5,6-tetrachloro-4-(methylsulphonyl)-pyridine, 2-methylthio-4-tert-butyl-amino-6-cyclopropylamine-s-triazin, and quinoline derivatives;

heterocyclic sulphur compounds such as 2-(4-thiazolyl) benzimidazole, 4,5-dichloro-2-octyl-3(2H)-isothiazolone, 4,5-dichloro-2-octyl-3(2H)-isothiazoline, 1,2-benzisothiazolin-3-one, and 2-(thiocyanatomethylthio)-benzothiazole;

urea derivatives such as N-(1,3-bis(hydroxymethyl)-2,5-dioxo-4-imidazolhdinyl)-N,N'-bis(hydroxymethyl) urea, and 3-(3,4-dichlorophenyl)-1,1-dimethyl urea;

amides or imides of carboxylic acids; sulphonic acids and of sulphenic acids such as 1,1-dichloro-N-((dimethylamino)sulphonyl)-1-fluoro-N-(4-methylphenyl)-methane-sulphenamide, 2,2-dibromo-3-nitrilo-propionamide, N-(dichlorofluoromethylthio)-phthalimide, N,N-dimethyl-N'-phenyl-N'-(dichlorofluoromethylthio)-sulphamide, and N-methylol formamide;

salts or esters of carboxylic acids such as 2-((3-iodo-2-propynyl)oxy)-ethanol phenylcarbamate and N,N-didecyl-N-methyl-poly(oxyethyl)ammonium propionate;

amines such as dehydroabiethylamines and cocodimethylamine;

substituted methane such as di(2-hydroxy-ethoxy) methane, 5,5'-dichloro-2,2'-dihydroxydiphenylmethane, and methylene-bisthiocyanate;

substituted benzene such as 2,4,5,6-tetrachloro-1,3-benzenedicarbonitrile, 1,1-dichloro-N-((dimethylamino)-sulphonyl)-1-fluoro-N-phenylmethanesulphenamide, and 1-((diiodomethyl) sulphonyl)-4-methyl-benzene;

tetraalkyl phosphonium halogenides such as tri-n-butyltetradecyl phosphonium chloride;

guanidine derivatives such as n-dodecylguanidine hydrochloride;

disulphides such as bis-(dimethylthiocarbamoyl)-disulphide, tetramethylthiuram disulphide;

and mixtures thereof.

In the antifouling paint, the total amount of the biologically active agent(s) may be in the range of 2–50%, such as 3–50%, by solids volume of the paint, preferably 5–50%, such as 5–40%, by solids volume of the paint. Depending upon the type and specific activity of the biologically active agent, the total amount of the biologically active agent may, e.g., be 5–15% or 10–25% by solids volume of the paint.

A typical marine antifouling paint according to the invention comprises a rosin-based binder system, one or more polymeric flexibilizer component(s) optionally at least one biologically active agent, and, where applicable, fibres. Furthermore, the antifouling paint may comprise one or more components selected among pigments, fillers, dyes, additives, and solvents. It should be understood that any solvents are not included in the contents stated as "% by solids volume". Instead, the content of solvent(s) is expressed as "solids volume ratio" or SVR which indicates the volume of the dry matter in relation to the total volume of the paint including the solvent.

Examples of pigments are grades of titanium dioxide, red iron oxide, zinc oxide, carbon black, graphite, yellow iron oxide, red molybdate, yellow molybdate, zinc sulphide, antimony oxide, sodium aluminium sulphosilicates, quinacridones, phthalocyanine blue, phthalocyanine green, titaniumdioxide, black iron oxide, graphite, indanthrone blue, cobalt aluminium oxide, carbazole dioxazine, chromium oxide, isoindoline orange, bis-acetoacet-o-tolidiole, benzimidazolon, qui-naphtalone yellow, isoindoline yellow, tetrachloroisoindolinone, quinophthalone yellow. Such materials are characterized in that they render the final paint coating non-transparent and non-translucent. The pigments may further be selected from pigment-like ingredients such as fillers. Examples of fillers are calcium carbonate, dolomite, talc, mica, barium sulphate, kaolin, silica, perlite, magnesium oxide, calcite and quartz flour, etc. These materials are characterized in that they do not render the paint non-translucent and therefore do not contribute significantly to hide any material below the coating of the paint of the invention.

In a preferred embodiment of the present invention, the paint has a total pigment content (pigment and pigment-like ingredients) in the range of 1–60%, preferably 1–50%, in particular 1–25% such as 1–15%, of the solids volume of the paint.

Examples of dyes are 1,4-bis(butylamino)anthraquinone and other anthraquinone derivatives; toluidine dyes etc.

Examples of additives are:

plasticizers such as chlorinated paraffin; phthalates such as dibutyl phthalate, benzylbutyl phthalate, dioctyl phthalate, diisononyl phthalate and diisodecyl phthalate; phosphate esters such as tricresyl phosphate, nonylphenol phosphate, octyloxipoly(ethyleneoxy)ethyl phosphate, tributoxyethyl phosphate, isooctylphosphate and 2-ethylhexyl diphenyl phosphate; sulphonamides such as N-ethyl-p-toluensulphonamide, alkyl-p-toluene sulphonamide; adipates such as bis(2-ethylhexyl)adipate), diisobutyl adipate and dioctyladipate; phosphoric acid triethyl ester; butyl stearate; sorbitan trioleate; and epoxidised soybean oil;

surfactants such as derivatives of propylene oxide or ethylene oxide such as alkylphenol-ethylene oxide condensates; ethoxylated monoethanolamides of unsaturated fatty acids such as ethoxylated monoethanolamides of linoleic acid; sodium dodecyl sulphate; alkylphenol ethoxylates; and soya lecithin;

wetting agents and dispersants such as those described in M. Ash and I. Ash, "Handbook of Paint and Coating Raw Materials, Vol. 1", 1996, Gower Publ. Ltd., Great Britain, pp 821–823 and 849–851;

defoaming agents such as silicone oils;

catalysts such as polymerization catalysts and initiators, e.g. azobisisobutyronitrile, ammonium persulphate, dilauryl peroxide, di-t-butyl peroxide, cumene hydroperoxide, p-toluenesulphonic acid; dryers, e.g. metal octoates and metal naphthenates; and activators, e.g. salicylic acid and benzyl alcohol;

stabilizers such as stabilizers against light and heat, e.g. hindered amine light stabilizers (HALS), 2-hydroxy-4-methoxybenzophenone, 2-(5-chloro-(2H)-benzotriazol-2-yl)-4-methyl-6-(tert-butyl)phenol, and 2,4-ditert-butyl-6-(5-chlorobenzotriazol-2-yl)phenol; stabilizers against moisture such as molecular sieves or water scavengers; stabilizers against oxidation such as butylated hydroxyanisole; butylated hydroxytoluene; propylgallate; toco-pherols; 2,5-di-tert-butyl-hydroquinone; L-ascorbyl palmitate; carotenes; vitamin A;

polymerization inhibitors, e.g. para-benzoquinone, hydroquinone and methyl-hydroquinone;

inhibitors against corrosion such as aminocarboxylates, calcium silicophosphate, ammonium benzoate, barium/calcium/zinc/magnesium salts of alkylnaphthalene sulphonic acids, zinc phosphate; zinc metaborate;

coalescing agents such as glycols, 2-butoxy ethanol, and 2,2,4-trimethyl-1,3-pentanediol monoisobutyrate; and thickeners and anti-settling agents such as colloidal silica, hydrated aluminium silicate (bentonite), aluminiumtristearate, aluminiummonostearate, ricinus oil, xanthan gum, salicylic acid, chrysotile, pyrogenic silica, hydrogenated castor oil, and organo-modified clays.

It is preferred that the paints according to the present invention comprises dyes and additives in a cumulative content of 0–15% by solids volume.

Examples of solvents in which the components of the antifouling paint are dissolved, dispersed or emulsified are water (e.g. in the form of a dispersion or an emulsion); alcohols such as methanol, ethanol, propanol, isopropanol, butanol, isobutanol and benzyl alcohol; alcohol/water mixtures such as ethanol/water mixtures; aliphatic, cycloaliphatic and aromatic hydrocarbons such as white spirit, cyclohexane, toluene, xylene and naphtha solvent; ketones such as methyl ethyl ketone, acetone, methyl isobutyl ketone, methyl isoamyl ketone, diacetone alcohol and cyclo-hexanone; ether alcohols such as 2-butoxyethanol, propylene glycol monomethyl ether and butyl diglycol; esters such as methoxypropyl acetate, n-butyl acetate and 2-ethoxyethyl acetate; chlorinated hydrocarbons such as methylene chloride, tetrachloroethane and trichloroethylene; and mixtures thereof.

A preferred embodiment of the marine antifouling paint according to the invention is a paint, which comprises one or more pigment(s) and one or more solvent(s) as well as any necessary or desirable dyes and additives.

The antifouling paint may be prepared by any suitable technique that is commonly used within the field of paint production. Thus, the various components may be mixed together using a high speed disperser, a ball mill, a pearl mill, a three-roll mill etc. The antifouling paints according to the invention, optionally containing fibres, may be filtrated using bag filters, patron filters, wire gap filters, wedge wire filters, metal edge filters, EGLM turnoclean filters (ex Cuno), DELTA strain filters (ex Cuno), and Jenag Strainer filters (ex Jenag), or by vibration filtration.

The antifouling paint according to the invention may be applied to the marine structure to be protected by means of any of the usual techniques used within the paint field such as by means of a brush, a roller, a pad, by dipping, by spraying etc. The exact technique chosen depends upon the object to be protected and also upon the particular composition (such as its viscosity etc.) and upon the particular situation. Preferred applications techniques are spraying and by means of a brush or a roller.

Depending on the application technique, it is desirable that the paint comprises solvent(s) so that the SVR is in the range of 30–70%.

The antifouling paint according to the invention may be applied to the marine structure to be protected in one or several successive layers, typically 1 to 5 layers, preferably 1 to 3 layers. The total dry film thickness (DFT) of the coating applied per layer will typically be 10 to 300 $\mu$m, preferably 20 to 250 $\mu$m, such as 40 to 200 $\mu$m. Thus, the thickness of the coating will typically be 10 to 900 $\mu$m, preferably 20 to 750 $\mu$m, in particular 40 to 600 $\mu$m, such as 80 to 400 $\mu$m.

The marine structure to which the paint according to the invention may be applied to may be any of a wide variety of solid objects that come into contact with water, for example vessels (including but not limited to boats, yachts, motorboats, motor launches, ocean liners, tugboats, tankers, container ships and other cargo ships, submarines Roth nuclear and conventional), and naval vessels of all types); pipes; shore and off-shore machinery, constructions and objects of all types such as piers, pilings, bridge substructures, floatation devices, underwater oil well structures etc; nets and other mariculture installations; cooling plants; and buoys; and is especially applicable to the hulls of ships and boats and to pipes.

Prior to the application of a paint of the invention to a marine structure, the marine structure may first be coated with a primer-system which may comprise several layers and may be any of the conventional primer systems used in connection with application of antifouling paints to marine structures. Thus, the primer system may include a first layer of a tar or bitumen composition followed by a layer of an adhesion-promoting primer. In a preferred embodiment, the primer-system is a composition having a polishing rate of less than 1 μm per 10,000 Nautical miles, i.e. the primer is a non-self-polishing coating.

As mentioned herein, the coating resulting from the paint according to the present invention is preferably self-polishing. Thus, the antifouling paint (actually the coating) should have a polishing rate of at least 1 μm per 10,000 Nautical miles (18,520 km). Preferably the polishing rate is in the range of 1–50 μm, in particular in the range of 1–30 μm per 10,000 Nautical miles (18,520 km).

It is furthermore preferred that the coating resulting from the paint according to the invention shows excellent mechanical properties when tested in various mechanical tests.

Thus, in a preferred embodiment, the paint according to the invention, when tested in the Steel Panel Elongation Test herein, is capable of being elongated 5 mm, preferably 6 mm, in particular 7 mm, such as 8 mm, without showing any tendency to neither micro cracking nor macro cracking.

A further preferred embodiment of the antifouling paint according to the invention is a paint, showing no failure when tested in the Mandrel Test herein using a mandrel having a diameter of at least 16 mm, preferably at least 12 mm, such as at least 10 mm, in particular at least 8 mm, such as at least 6 mm.

A still further preferred embodiment of the antifouling paint according to the invention is a paint, showing no failure when tested in the Direct Impact Test herein using the standard weight dropped from a height of at least 50 cm, preferably at least 60 cm, such as at least 70 cm or even at least 90 cm.

The optimal composition of the antifouling paints described herein will of course depend on the characteristics and properties of the individual components of the paint. Among these components, the polymeric flexibilizer seems to be one of the most important and crucial for obtaining the desired compromise between mechanical strength and antifouling properties. Thus, especially interesting embodiments of the present invention are marine antifouling paints of the following compositions:

(A): 1) rosin or rosin equivalents constituting 15–80% by solids volume of the paint; 2) further binder components constituting 0–15% by solids volume of the paint; 3) fibres constituting 0.1–30% by solids volume of the paint; 4) one or more non-crystalline polymeric flexibilizer component(s) constituting 1–20% by solids volume of the paint; 5) one or more biologically active agent(s) constituting 2–50% by solids volume of the paint; 6) one or more pigment(s) constituting 1–15% by solids volume of the paint; 7) dyes and additives constituting 0–15% by solids volume of the paint; and 8) optionally one or more solvents.

(B): 1) rosin or rosin equivalent(s) constituting 25–60% by solids volume of the paint; 2) further binder components constituting 0–15% by solids volume of the paint; 3) fibres constituting 2–10% by solids volume of the paint; 4) one or more non-crystalline polymeric flexibilizer component(s) constituting 1–20% by solids volume of the paint, at least one component being of the polyvinyl ether-type and having a glass transition temperature ($T_g$) in the range of –40 to –20° C.; 5) one or more biologically active agent(s) constituting 2–50% by solids volume of the paint composition; 6) one or more pigment(s) constituting 1–15% of the solids volume of the paint composition; 7) dyes and additives constituting 0–15% by solids volume of the paint; and 8) optionally one or more solvents.

(C):1) rosin or rosin equivalent(s) constituting 25–60% by solids volume of the paint; 2) further binder components constituting 0–15% by solids volume of the paint; 3) fibres constituting 2–10% by solids volume of the paint; 4) one or more non-crystalline polymeric flexibilizer component(s) constituting 1–20% by solids volume of the paint, at least one component being of the polyacrylamide-type and having a glass transition temperature in the range of –30 to 25° C.; 5) one or more biologically active agent(s) constituting 2–50% by solids volume of the paint; 6) one or more pigment(s) constituting 1–15% of the solids volume of the paint; 7) dyes and additives constituting 0–15% by solids volume of the paint; and 8) optionally one or more solvents.

(D):1) rosin or rosin equivalents constituting 25–60% by solids volume of the paint; 2) further binder components constituting 0–15% by solids volume of the paint; 3) fibres constituting 2–10% by solids volume of the paint; 4) one or more non-crystalline polymeric flexibilizer component(s) constituting 1–20% by solids volume of the paint, at least one component being of the polyacrylate-type and having a glass transition temperature ($T_g$) in the range of –30 to 0° C.; 5) one or more biologically active agent(s) constituting 2–50% by solids volume of the paint; 6) one or more pigment(s) constituting 1–15% of the solids volume of the paint; 7) dyes and additives constituting 0–15% by solids volume of the paint; and 8) optionally one or more solvents.

These paints may comprise further components not explicitly mentioned if considered necessary or desirable.

Test Methods

Test panels are/were degreased with methyl isobutyl ketone prior to application of primer/paint.

Laboratory Cracking Test

The test paint is applied onto a steel panel (10×15 cm$^2$) by means of a hand applicator (doctor blade type) in a dry film thickness (DFT) of approximately 200+/–30 μm. The panel is dried for two days in the oven at 60° C.

The anti-cracking performance is evaluated on a scale from 0 to 10:

0 10–100% of the area of the steel panel shows macro cracking.

1 Macro cracking is observed on an area-percentage lower than 10, and/or micro cracking is observed on 50–100% of the area of the panel.

2 Micro cracking is observed on less than 50% of the area of the panel.

3–4 Neither macro nor micro cracking is observed, but the paint film is very brittle when cut with a sharp knife.

5–6 No cracking is observed. The dry paint film shows some cohesive properties when cut with a sharp knife.

7–8 No cracking is observed. The dry paint film shows acceptable cohesive properties when cut with a sharp knife. The cutting of the sample of the film of 1×1 cm$^2$ can be performed without cracking or breaking of the sample.

9–10 No cracking is observed. The dry paint film shows good cohesive properties when cut with a sharp knife. A free-cut film of 1×1 cm$^2$ shows some flexibility and toughness.

Macro cracking corresponds to cracking mesh size type medium and large described in TNO circular 92.

Micro cracking corresponds to cracking mesh size type small and micro described in TNO circular 92.

Steel Panel Elongation Test

A cold rolled steel panel (15×3×0.1 cm$^3$) is coated with 125 μm (DFT) of a commercial coal tar epoxy primer (Hempadur Tar Epoxy 15130 ex Hempel's Marine Paints A/S) applied by air spraying. After 12–36 hours drying in the laboratory at room temperature a second coat is applied in 80 μm DFT of a commercial vinyl primer (Hempanyl Tar 16280 ex Hempel's Marine Paints A/S) applied by air spraying. After minimum 24 hours drying in the laboratory at room temperature the test paint is applied by air spraying in two coats in a DFT of approximately 100 μm per coat (total model paint DFT: 200 μm). Recoating interval between two coats of the test paint: 24 hours. The panel is dried for 4 days in the oven at 60° C.

The test panel is tested at 20–23° C. in an Instron equipment (Instron 4507), by triplicate, in the following way. The steel panel is clamped in sample holders. One sample holder has a fixed position and the other is moved away at a constant speed of 5 mm per min. The full paint system and the steel panel are elongated until the paint film breaks (cracks), and the elongation is measured. The higher elongation, the better mechanical properties.

Polishing Rate Test

An acrylic test panel (13.5×7 cm$^2$) with a curvature corresponding to that of a cylindrical drum with a diameter of 1 m is first coated with 80 μm (DFT) of a commercial vinyl primer (Hempanyl Tar 16280 ex Hempel's Marine Paints A/S) applied by air spraying. After minimum 24 hours drying in the laboratory at room temperature the test paint is applied by air spraying in two coats in a DFT of approximately 100 μm per coat (total test paint DFT: 200 μm). Recoating interval between two coats of test paint: 24 hours. After at least 48 hours drying from the last test paint coat, bands of 1 cm width of a commercial, non-erodible vinyl antifouling coating (Classic 76550 ex Hempel's Marine Paints A/S) are applied along each longitudinal edge by dipping. As a result of this, the central part with a width of 5 cm remained uncovered by the non-erodible coating. The panel is dried for at least 1 week in the laboratory at room temperature before testing.

The test panel is fixed onto the convex surface of a cylindrical drum of 1 m in diameter and is rotated in sea water with a salinity in the range of 37–38 parts per thousand at an average temperature of 26° C. at a test site in the harbour of Villanova y La Geltrú in Northeastern Spain which is situated at longitude 41.2° N (see also Morale, E. & Arias, E., Rev. Iber. Corros. y Prot., vol XIX(2), 1988, pp. 91–96). The rotor is rotated at a peripheral speed of 15 knots for a relative distance of 33,100 Nautical miles.

Every 3–5 weeks, paint chips (1.0×0.5 cm$^2$) are collected from the test panel in such a way that their surface comprised both a part coated with the experimental coating only as well as a part coated with both experimental coating and the non-erodible coating. The chips are embedded in paraffin wax and cut with a microtome. Cross sections of the experimental coating are examined under a microscope. Compared to the part coated with the non-erodible coating, the experimental coating shows a decrease of DFT of the outer layer corresponding to the polishing rate. The polishing rate (polishing per 10,000 Nautical miles (18,520 km)) is calculated.

Polishing rate tests are generally described by Furtado, S. E. J. and Fletcher, R. L., "Test Procedures For Marine Antifouling Paints. Preservatives in The Food Pharmaceutical and Environmental Industries", pp 145–163 (1987) and Van Londen, A. M., "Evaluation of Testing Methods for Antifouling Paints", Journal of Paint Technology, 42, pp 511–515 (1970).

Mechanical Properties Test—Mandrel Test

A steel panel (15×10×0.5 cm$^3$) is coated with 10 μm (DFT) of a commercial polyvinyl butyral wash primer (Hempadur 15200, from Hempel's Marine Paints A/S) applied by air spraying. After drying for 12–36 hours in the laboratory at room temperature the experimental model paint is applied by air spraying in one coat in a DFT of approximately 100 μm. The panel is dried for 1 day in the laboratory at room temperature plus one day in the oven at 60° C. before testing.

The test panel is tested using a cylindrical mandrel according to ASTM Designation D522 using cylindrical mandrels. The steel panel is bend using mandrels of different diameters and inspected for cracking. By gradually decreasing the mandrel diameter, the point of which failure occurs is determined. The smaller diameter, the better mechanical properties. Mandrels of the following diameters are used (32, 25, 20, 19, 16, 13, 12, 10, 8, 6, 5, 4, and 3 mm).

Mechanical Properties Test—Direct Impact Test

A steel panel (15×10×0.8 cm$^3$) is coated with 10 μm (DFT) of a commercial polyvinyl butyral wash primer (Hempadur 15200, from Hempel's Marine Paints A/S) applied by air spraying. After drying for 12–36 hours in the laboratory at room temperature the experimental model paint is applied by air spraying in one coat in a DFT of approximately 100 μm. The panel is dried for 1 day in the laboratory at room temperature plus one day in the oven at 60° C. before testing.

The test panel is tested for direct impact strength according to ASTM Designation D 2794. The standard weight (100 g; indentor diameter 20 mm) is dropped from a height so as to strike an indentor that deforms the coating and the substrate. By gradually increasing the height from which the weight is dropped, the point of which failure occurs is determined. The higher distance the better mechanical properties. The initial height is 10 cm. The height is increased 10 cm each time until a visual failure is observed.

Determination of Weight Average Molecular Weight ($M_w$) for Various Polymers

The $M_w$ is determined by using an experimental set-up comprising a 600E pump from Waters, U.S.A., Shodex KF 803 and KF 804 columns from Shoko Co., Ltd., Japan, a 700 Satellite WISP auto-sampler, a 410 Differential refractometer detector, and Millenium Ver. 2.10 HPLC and GPC software all from Waters, U.S.A.

The mobile phase of the system is tetrahydrofuran at a flow rate of 1 ml/min. The column temperature is 40° C. and the detector temperature is 35° C. The sample is typically 1% (w/w) of the polymer dissolved in tetrahydrofuran. (Higher sample concentrations may be used in the case of very low detector signals.) 15–100 μL of sample is used. Internal standard are: Narrow polystyrene standards of molecular weight 1,200,000, 128,000, 39,000, 5,700, 950, 280 (Polymer Laboratories, Ltd., U.K.), and toluene ($M_w$ 92). Determination of Glass Transition Temperature ($T_g$)

$T_g$ is determined by using a Perkin Elmer DSC-7 apparatus at a heating rate of 10° C./min.

Table 1 gives an overview of the different polymeric flexibilizer components tested in Example 1.

TABLE 1

| Sample | Generic polymer-type | $T_g$/° C. |
|---|---|---|
| 1 | Ethyl acrylate | −11 |
| 2 | Methyl acrylate-based copolymer | −8 |
| 3 | Acrylamide-based copolymer | −16 |

TABLE 1-continued

| Sample | Generic polymer-type | | $T_g/°C$ |
|---|---|---|---|
| 4 | Acrylamide-based Terpolymer | | −22 |
| 5 | | | — |
| 6 | Unsaturated polyester | | −32 |
| 7 | Acrylamide-based Terpolymer | | 21 |
| 8 | | | 0 |
| 9 | Reacted | Aromatic | — |
| 10 | Polyurethane | Aliphatic | −36 |
| 11 | | Aliphatic OH groups | −35 |
| 12 | Epoxy ester | | −20 |
| 13 | Hydroxy acrylic | | −16 |
| 14 | Fluoropolymer | | −11 |
| 15 | Reacted aromatic | | −29 |
| 16 | Polyurethane | | −45 |
| 17 | Polyvinyl methyl ether | | −30 |
| 18 | Self-crosslinking polyacrylate | | — |
| 19 | Epoxy ester | | −5 |
| 20 | | | −1 |
| 21 | Vinyl acetate/Vinyl laurate | | — |
| 22 | Copolymer | | — |
| | Reference polymers | | |
| 100 | Vinyl resin | | 49 |
| 101 | Vinyl resin | | 42 |
| 102 | Acrylic resin | | 52 |
| 103 | Acrylic resin | | 58 |
| 104 | Acrylic resin | | −55 |

The sample numbers correspond to the following commercial products:

| Sample | Product name | Supplier |
|---|---|---|
| 1 | PLEXISOL B-372 | RÖHM, Germany |
| 2 | PARALOID C-10 LV | ROHM & HAAS, U.S.A. |
| 3 | ALBURESIN HA 14 | ALBUS, Spain |
| 4 | SYNOCRYL 7013 ASB | CRAY VALLEY, Spain |
| 5 | SYNOCRYL 839S | |
| 6 | LTW RESIN | HÜLS, Germany |
| 7 | URACRON CS 106 XB | DSM, Holland |
| 8 | URACRON CS 104 M | |
| 9 | URAFLEX EU 66 N | |
| 10 | URAFLEX EU 110 M1 | |
| 11 | URAFLEX EU 221 M1 | |
| 12 | JÄGALYD FES 421 | JÄGER, Germany |
| 13 | JAGOTEX F 238 | |
| 14 | LUMIFLON 552 | ZENECA, Spain |
| 15 | NEOREZ U-480 | |
| 16 | NEOREZ U-322 | |
| 17 | LUTONAL M40 | BASF, Germany |
| 18 | LARODUR 103 RB | BASF, Germany |
| 19 | WORLÉEDUR MF 45 | WORLÉE, Germany |
| 20 | WORLÉEDUR D 46 | |
| 21 | VINNAPAS B 100/20 VL | WACKER, Germany |
| 22 | VINNAPAS B 500/20 VL | |
| | Reference polymers | |
| 100 | LAROFLEX MP 25 | BASF, Germany |
| 101 | VILIT MC 31 | HÜLS, Germany |
| 102 | ACRYLOID B-67 | ROHM & HAAS, U.S.A. |
| 103 | ACRYLOID B-66 | ROHM & HAAS, U.S.A |
| 104 | ACRONAL 4 F | BASF, Germany |

The invention is illustrated by the following Examples.

EXAMPLE 1

Rosin is a very brittle material. Paints formulated with rosin as the main or sole binder component show a very pronounced tendency to crack. A number of polymeric flexibilizer components were tested in the Laboratory Cracking Test for their effect on preventing cracking and improving film integrity in a rosin based model paint without fibres.

Model paints A with the following compositions were prepared:

60 parts by volume of zinc resinate (Terpenato 620 NN50 ex Resisa, Spain)

10 parts by volume of cuprous oxide with an average particle size of 2–4 μm Nordox cuprous oxid paint grade, red, micromilled ex NORDOX Industrier A/S, Norway)

26 parts by volume of zinc oxide with an average particle size of approximately 0.2 μm (Zinc oxide superior red seal SR3S ex Fabrica Espanola de Blanco de Zinc, S. A., Spain)

4 parts by volume of thixotropic bentonite (Bentone 38 ex NL Chemicals) optionally 16 parts by volume of a polymeric flexibilizer (component) (see Table 1)

20–30% by weigh of total wet paint of xylene

Generally, the model paints were prepared as follows:

200 ml thoroughly mixed coating composition was introduced into a tight metallic container of 0.5 L capacity together with 100 mL (bulk volume) of glass beads with a diameter of 2–3 mm. The container was then shaken for 45 min. on a mechanical shaker. The coating composition was separated from the glass beads by filtration.

The commercial grades of zinc resinate, cuprous oxide, zinc oxide, and bentonite was also used in the following examples. The product names used in the following examples correspond to the flexibilizer components, polymeric binder components, and fibres listed above, cf. the list of fibres and Table 1.

In each test series a reference paint, without any content of polymeric flexibilizer components, was included. In Table 2 the results of the tests are shown.

TABLE 2

| Polymeric flexibilizer Sample No. | Laboratory Cracking Test Model paints A |
|---|---|
| 1 | 9 |
| 2 | 5 |
| 3 | 4 |
| 4 | 4 |
| 5 | 4 |
| 6 | 6 |
| 7 | 4 |
| 8 | 4 |
| 9 | 10 |
| 10 | 7 |
| 11 | 6 |
| 12 | 6 |
| 13 | 5 |
| 14 | 4 |
| 15 | 6 |
| 16 | 6 |
| 17 | 6 |
| 18 | 6 |
| 19 | 4 |
| 20 | 4 |
| 21 | 7 |
| 22 | 7 |
| Reference material100 | 0 |
| Reference material101 | 0 |
| Reference material102 | 2 |
| Reference material103 | 2 |
| Reference material104 | 0 |
| Noflexibilizer | 0 |

Alternatively, 4 parts by volume of fibres were incorporated in Model Paint A (in the absence of a polymer flexibilizer) in order to determine the performance of the fibres alone. Fibres having resulting in a rating of at least 1 are considered especially suitable for incorporation in combination with flexibilizers. The Model Paint A was prepared as described above. The results from tests are given in Table 3 where the Fibre Sample Nos. correspond to the list of commercially available fibres given in the description.

| Fibre Sample No. | Laboratory Cracking Test Model Paint A |
|---|---|
| 1 | 8 |
| 4 | 9 |
| 5 | 9 |
| 6 | 9 |
| 7 | 9 |
| 8 | 8 |
| 9 | 8 |
| 10 | 7 |
| 11 | 8 |
| 12 | 8 |
| 13 | 8 |
| 14 | 8 |
| 15 | 8 |
| 16 | 8 |
| 17 | 7 |
| 18 | 8 |
| 19 | 5 |
| 20 | 5 |
| 21 | 1 |
| 22 | 5 |
| 23 | 5 |
| 24 | 8 |
| 25 | 6 |
| 26 | 6 |
| 27 | 1 |
| 28 | 8 |
| 29 | 7 |
| 30 | 3 |
| 31 | 5 |
| 32 | 3 |
| 33 | 3 |
| 34 | 7 |
| 35 | 5 |
| 36 | 8 |
| 37 | 8 |
| 38 | 7 |
| 39 | 5 |
| 40 | 2 |
| 41 | 9 |
| 42 | 6 |
| 43 | 1 |
| 44 | 3 |
| 45 | 3 |
| 46 | 7 |
| 47 | 6 |
| 48 | 6 |
| 49 | 6 |
| 50 | 6 |
| 51 | 4 |
| 52 | 3 |
| No fibres | 0 |

EXAMPLE 2

Various Model paints B were tested in order to demonstrate the advantageous effect of the polymeric flexibilizer component(s), the fibres, as well as the combined effect of the polymeric flexibilizer component(s) and the fibres (see Table 4). The Model paints B1–B10 were prepared as described for the Model paints A.

TABLE 4

| Paint No. | B1 | B2 | B3 | B4 | B5 | B6 | B7 | B8 | B9 | B10 |
|---|---|---|---|---|---|---|---|---|---|---|
| Cuprous oxide | 10 | 10 | 10 | 10 | 10 | 10 | 10 | 10 | 10 | 10 |
| Zinc oxide | 26 | 26 | 26 | 26 | 26 | 26 | 26 | 26 | 26 | 26 |
| Bentone 38 | 4 | 4 | 4 | 4 | 4 | 4 | 4 | 4 | 4 | 4 |
| Zinc resinate | 60 | 60 | 60 | 60 | 60 | 60 | 60 | 60 | 60 | 60 |
| Lapinus RF 5104 | | 4 | 4 | | | | | | | |
| Nyad G | | | | 4 | 4 | | | | | |
| Inorphil 061-10 | | | | | | 4 | 4 | | | |
| Lanco MIKAL 00180 | | | | | | | | | 4 | 4 |
| Lutonal M 40 | | | 16 | | | | | | | |
| Synocryl ASB 7013 | | | | | 16 | | | | | |
| Plexisol B372 | | | | | | | 16 | | | |
| Laroflex MP25 | | | | | | | | | 16 | 16 |

Xylene was used as a solvent so that the solids volume ratio was 50% in each of the paints B1–B10. All proportions expressed in % by solids volume. Lanco MIKAL 00180 ex G. M. Langer, Germany, used in this and other examples is an inert filler component.

The increased mechanical strength of the model paints B2–B7 over the reference compositions B1 and B8–B10 was illustrated in the Steel Panel Elongation Test, the Direct Impact Test, the Mandrel Test, and the Laboratory Cracking Test as outlined in Table 5.

TABLE 5

| Model Paint No. | DFT ($\mu$m) | Steel Panel Elongation Test Elongation at which the film starts to break (mm) | Direct Impact Test Height at which failure occurs (cm) | Mandrel Test First mandrel diameter (mm) showing cracking | Laboratory Cracking Test 0 the worse 10 the best |
|---|---|---|---|---|---|
| B1 | 205 | 1.3 | 10 | 32 | 2 |
| B2 | 208 | 5.7 | 60 | 19 | 7 |
| B3 | 176 | 12.2 | 80 | 3 | 9 |
| B4 | 223 | 5.0 | 50 | 19 | 6 |
| B5 | 169 | 7.3 | 60 | 19 | 7 |
| B6 | 227 | 6.3 | 60 | 19 | 8 |
| B7 | 216 | 15.1 | 80 | 3 | 9 |
| B8 | 192 | 1.3 | 10 | 32 | 2 |
| B9 | 244 | 1.4 | 10 | 32 | 2 |
| B10 | 212 | 1.4 | 10 | 32 | 2 |

EXAMPLE 3

The advantageous effect of the combination of the polymeric flexibilizer component(s) and fibres is further illustrated with the Model paints C1–C12 and D1–D4 (see Tables 6 and 7 and Table 8 for test results). The Model paints C2–C7 and D2 are compositions according to the invention and the Model paints C1, C8–C12, D1, and D3–D4 are reference paints. Model paints C1–C12 and D1–D4 were prepared as described for Model paint A.

TABLE 6

| Paint No. | C1 | C2 | C3 | C4 | C5 | C6 | C7 | C8 | C9 | C10 | C11 | C12 |
|---|---|---|---|---|---|---|---|---|---|---|---|---|
| Cuprous oxide | 35.1 | 33.2 | 30.5 | 33.2 | 30.5 | 33.2 | 30.5 | 33.2 | 32.1 | 30.5 | 30.5 | 30.5 |
| Zinc oxide | 9.5 | 9 | 8.3 | 9 | 8.3 | 9 | 8.3 | 9 | 8.8 | 8.3 | 8.3 | 8.3 |
| Kemira RD 2 | 4.7 | 4.5 | 4.1 | 4.5 | 4.1 | 4.5 | 4.1 | 4.5 | 4.3 | 4.1 | 4.1 | 4.1 |
| NUSA 57 | 2.1 | 2 | 1.8 | 2 | 1.8 | 2 | 1.8 | 2 | 1.9 | 1.8 | 1.8 | 1.8 |
| Bentone 38 | 4.9 | 4.7 | 4.3 | 4.7 | 4.3 | 4.7 | 4.3 | 4.7 | 4.5 | 4.3 | 4.3 | 4.3 |
| Zinc resinate | 43.7 | 41.3 | 38 | 41.3 | 38 | 41.3 | 38 | 41.3 | 40 | 38 | 38 | 38 |
| Lapinus RF 5104 |  | 5.3 | 5 |  |  |  |  |  |  |  |  | 5 |
| Nyad G |  |  |  | 5.3 | 5 |  |  |  |  |  |  |  |
| Inorphil 061-10 |  |  |  |  |  | 5.3 | 5 |  |  |  |  |  |
| Lanco MIKAL 00180 |  |  |  |  |  |  |  |  | 5.3 |  | 5 | 5 |
| Lutonal M 40 |  |  | 8 |  |  |  |  |  |  |  |  | 8 |
| Synocryl ASB 7013 |  |  |  |  | 8 |  |  |  |  |  |  |  |
| Plexisol B372 |  |  |  |  |  |  | 8 |  |  |  |  |  |
| Laroflex MP25 |  |  |  |  |  |  |  |  | 8.4 | 8 |  | 8 |

TABLE 7

| Paint No. | D1 | D2 | D3 | D4 |
|---|---|---|---|---|
| Cuprous oxide | 32.6 | 30 | 32.6 | 30 |
| Zinc oxide | 9.7 | 8.9 | 9.7 | 8.9 |
| Kemira RD 2 | 4.3 | 4 | 4.3 | 4 |
| NUSA 57 | 2 | 1.8 | 2 | 1.8 |
| Bentone 38 | 4.7 | 4.3 | 4.7 | 4.3 |
| Zinc resinate | 35.9 | 33 | 35.9 | 33 |
| Laroflex MP25 | 5.4 | 5 | 5.4 | 13 |
| Inorphil 061-10 | 5.4 | 5 |  |  |
| Lanco MIKAL 00180 |  |  | 5.4 | 5 |
| Lutonal M 40 |  | 8 |  |  |

Xylene was used as solvent so that the solids volume ratio was 45% in each of the paints D1–D4. All proportions expressed in % by solids volume.

TABLE 8

| Model Paint No. | Steel Panel Elongation Test | | Direct Impact Test | Mandrel Test | Laboratory |
|---|---|---|---|---|---|
|  | (DFT) ($\mu$m) | Elongation at which the film starts to break (mm) | Height at which failure occurs (cm) | First mandrel diameter (mm) showing cracking | Cracking Test 0 the worse 10 the best |
| C1 | 230 | 1.5 | 10 | 25 | 3 |
| C2 | 220 | 6.0 | 70 | 16 | 7 |
| C3 | 208 | 9.2 | 80 | 5 | 8 |
| C4 | 221 | 5.2 | 50 | 16 | 6 |
| C5 | 225 | 6.0 | 60 | 16 | 6 |
| C6 | 227 | 6.8 | 70 | 16 | 8 |
| C7 | 217 | 7.3 | 80 | 5 | 8 |
| C8 | 225 | 1.6 | 10 | 25 | 3 |
| C9 | 210 | 2.0 | 10 | 25 | 3 |
| C10 | 213 | 2.0 | 10 | 25 | 4 |
| C11 | 233 | 5.2 | 60 | 12 | 7 |
| C12 | 208 | 4.2 | 50 | 19 | 6 |
| D1 | 230 | 4.5 | 50 | 19 | 6 |
| D2 | 217 | 6.2 | 70 | 10 | 8 |
| D3 | 226 | 2.0 | 10 | 25 | 4 |
| D4 | 228 | 1.5 | 10 | 25 | 4 |

What is claimed is:

1. A self-polishing marine antifouling paint comprising:
   1) 20–70% by solid volume of the paint of a rosin-based binder system comprising at least 30% by solids volume of the binder system of rosin or rosin equivalent(s);
   2) 0.5–10% by solids volume of the paint of fibers having a ratio between the average length and the average thickness of at least 5; and
   3) 0.5–40% by solids volume of the paint of one or more polymeric flexibilizer component(s).

2. A self-polishing marine antifouling paint comprising a binder system which comprises at least 30% by solids volume of rosin or rosin equivalents), the binder system being present in the paint in such an amount and having such a composition that the paint when tested in (a) the Laboratory Cracking Test herein results in a ranking of below 5, or (b) the Steel Panel Elongation Test herein show micro or macro cracking when elongated 4 mm in the absence of any principle counteracting the mechanical deficiency, the paint further comprises
   (a) one or more kind of fibers, which, when incorporated into a paint comprising 60 parts by volume of zinc resinate, 10 parts by volume of cuprous oxide with an average particle size of 2–4 $\mu$m, 26 parts by volume of zinc oxide with an average particle size approximately 0.2 $\mu$m, 4 parts by volume of thixotropic bentonite, and 20–30% by weight of total wet paint of xylene in an amount of 4 parts by volume and tested in the Laboratory Cracking Test herein, result in a cracking ranking of said paint of at least 1; and
   (b) one or more polymeric flexibilizer components, which, when incorporated into said paint and tested in the Laboratory Cracking Test herein, result in a cracking ranking of said paint of at least 3.

3. A marine antifouling paint according to any of the claims 1–2, the paint further comprising at least one biologically active agent.

4. A marine antifouling paint according to claims 1–2, wherein the content of rosin or rosin equivalent(s) is in the range of 15–80% by solid volume of the paint.

5. A marine antifouling paint according to claims 1–2, which comprises further binder component(s) in an amount of 0–15% by solids volume of the paint.

6. A marine antifouling paint according to claims 1–2, wherein the rosin or rosin equivalent(s) comprise(s) less than 30% of abietic acid-type compounds having two conjugated double bonds.

7. A marine antifouling paint according to claims 1–2, wherein the degree of unsaturation in the rosin or rosin equivalent(s), as determined by the NMR method described herein, is less than 3%.

8. A marine antifouling paint according to claims 1–2, wherein at least a part of the rosin is in the form of metal resinate.

9. A marine antifouling paint according to claim 8, wherein the metal resinate is selected from zinc resinate, copper resinate, and calcium resinate.

10. A marine antifouling paint according to claims 1–2, wherein each of the polymeric flexibilizer component(s) has a glass transition temperature ($T_g$) in the range of −45° C. to 25° C.

11. A marine antifouling paint according to claims 1–2, wherein each of the polymeric flexibilizer(s) is selected from poly(meth)acrylates, polyacrylamides as well as copolymers and terpolymers hereof, acrylamide resins, acrylic acrylamide resins, polyvinyl ethers, polyvinyl esters, polyesters, polyoxy-$C_{1-5}$-alkylenes, polyurethanes, and epoxy esters.

12. A marine antifouling paint according to claims 1–2, wherein the polymeric flexibilizer(s) constitute(s) 1–20% by solids volume of the paint.

13. A marine antifouling paint according to claims 1–2, wherein the combination of the binder system (constituted by rosin and rosin equivalent(s) and optionally further binder components) and the polymeric flexibilizer(s) has a polishing rate of at least 1 μm per 10,000 Nautical miles, when incorporated in a paint:
   60%, by solids volume, of a mixture of the binder system and the polymeric flexibilizer in the relevant relative amounts
   26%, by solids volume, of zinc oxide
   10%, by solids volume, of cuprous oxide
   4%, by solids volume, of thixotropic bentonite
and tested in the Polishing Rate Test herein.

14. A marine antifouling paint according to any of the claims 1–2, wherein the fibers are natural or synthetic inorganic fibers, natural or synthetic organic fibers, or mixtures thereof.

15. A marine antifouling paint according to claim 14, wherein the fibers are inorganic fibers.

16. A marine antifouling paint according to claim 2, wherein the concentration of the fibers is in the range of 0.5–10% by solids volume of the paint.

17. A marine antifouling paint according to claim 1 or 2, which additionally comprises one or more pigment(s), one or more dye(s) and additive(s), and one or more solvent(s).

18. A self-polishing marine antifouling paint comprising:
   1) rosin or rosin equivalent(s) constituting 15–80% by solids volume of the paint;
   2) further binder components constituting 0–15% by solids volume of the paint;
   3) fibers constituting 0.5–10% by solids volume of the paint, where the fibers have a ratio between the average length and the average thickness of at least 5;
   4) one or more non-crystalline polymeric flexibilizer component(s) constituting 1–20% by solids volume of the paint;
   5) one or more biologically active agent(s) constituting 2–50% by solids volume of the paint composition;
   6) one ore more pigment(s) constituting 1–15% of the solids volume of the paint composition;
   7) dyes and additives constituting 0–15% by solids volume of the paint; and
   8) optionally one or more solvents.

19. A self-polishing marine antifouling paint comprising:
   1) rosin or rosin equivalent(s) constituting 25–60% by solids volume of the paint;
   2) further binder components constituting 0–15% by solids volume of the paint;
   3) fibers constituting 2–10% by solids volume of the paint, where the fibers have a ratio between the average length and the average thickness of at least 5;
   4) one or more non-crystalline polymeric flexibilizer component(s) constituting 1–20% by solids volume of the paint, at least one component being of the polyvinyl ether-type and having a glass transition temperature ($T_g$) in the range of −40 to −20° C.;
   5) one or more biologically active agent(s) constituting 2–50% by solids volume of the paint composition;
   6) one ore more pigment(s) constituting 1–15% of the solids volume of the paint composition;
   7) dyes and additives constituting 0–15% by solids volume of the paint; and
   8) optionally one or more solvents.

20. A marine self-polishing antifouling paint comprising:
   1) rosin or rosin equivalents) constituting 25–60% by solids volume of the paint;
   2) further binder components constituting 0–15% by solids volume of the paint ;
   3) fibers constituting 2–10% by solids volume of the paint, where the fibers have a ratio between the average length and the average thickness of at least 5;
   4) one or more n on-crystalline polymeric flexibilizer component(s) constituting 1–20% by solids volume of the paint, at least one component being of the polyacrylamide-type and having a glass transition temperature in the range of −30 to 25° C.;
   5) one or more biologically active agent(s ) constituting 2–50% by solids volume of the paint composition;
   6) one ore more pigment(s) constituting 1–15% of the solids volume of the paint composition;
   7) dyes and additives constituting 0–15% by solids volume of the paint; and
   8) optionally one or more solvents.

21. A self-polishing marine antifouling paint comprising:
   1) rosin or rosin equivalents) constituting 25–60% by solids volume of the paint;
   2) further binder components constituting 0–15% by solids volume of the paint;
   3) fibers constituting 2–10% by solids volume of the paint, where the fibers have a ratio between the average length and the average thickness of at least 5;
   4) one or more non-crystalline polymeric flexibilizer component(s) constituting 1–20% by solids volume of the paint, at least one component being of the polyacrylate-type and having a glass transition temperature ($T_g$) in the range of −30 to 0° C.;
   5) one or more biologically active agent(s) constituting 2–50% by solids volume of the paint composition;
   6) one ore more pigment(s) constituting 1–15% of the solids volume of the paint composition;
   7) dyes and additives constituting 0–15% by solids volume of the paint; and
   8) optionally one or more solvents.

22. A marine antifouling paint according to claim 15 wherein the inorganic fibers are mineral fibers.

23. A self-polishing marine antifouling paint comprising:
1) 20–70% by solid volume of the paint of rosin-based binder system comprising at least 30% by solids volume of the binder system of rosin or rosin equivalent(s);
2) 0.5–30% by solids volume of the paint of mineral fibers having a ratio between the average length and the average thickness of at least 5; and
3) 0.5–40% by solids volume of the paint of one or more polymeric flexibilizer components(s).

24. A self-polishing marine antifouling paint comprising:
1) 20–70% by solid volume of the paint of rosin-based binder system comprising at least 30% by solids volume of the binder system of rosin or rosin equivalent(s);
2) 0.5–30% by solids volume of the paint of organic fibers having a ratio between the average length and the average thickness of at least 5; and
3) 0.5–40% by solids volume of the paint of one or more polymeric flexibilizer component(s).

* * * * *